United States Patent
Kumar et al.

(10) Patent No.: US 12,045,147 B2
(45) Date of Patent: Jul. 23, 2024

(54) LOSSLESS FAILOVER FOR DATA RECOVERY

(71) Applicant: Rubrik, Inc., Palo Alto, CA (US)

(72) Inventors: Abhishek Kumar, San Jose, CA (US); Siyuan Sheng, Mountain View, CA (US); Yiying Yu, Santa Clara, CA (US); Shaswat Chaubey, Mountain View, CA (US)

(73) Assignee: Rubrik, Inc., Palo Alto, CA (US)

( * ) Notice: Subject to any disclaimer, the term of this patent is extended or adjusted under 35 U.S.C. 154(b) by 0 days.

(21) Appl. No.: 17/959,130

(22) Filed: Oct. 3, 2022

(65) Prior Publication Data
US 2024/0111642 A1    Apr. 4, 2024

(51) Int. Cl.
*G06F 11/20* (2006.01)
*G06F 9/455* (2018.01)
*G06F 11/14* (2006.01)
*G06F 11/16* (2006.01)

(52) U.S. Cl.
CPC ...... *G06F 11/2023* (2013.01); *G06F 9/45558* (2013.01); *G06F 11/1469* (2013.01); *G06F 11/1658* (2013.01); *G06F 2009/45575* (2013.01); *G06F 2009/45595* (2013.01); *G06F 2201/84* (2013.01)

(58) Field of Classification Search
CPC ............. G06F 11/2023; G06F 11/1469; G06F 11/1446; G06F 11/203; G06F 2009/45575
See application file for complete search history.

(56) References Cited

U.S. PATENT DOCUMENTS

| | | | |
|---|---|---|---|
| 8,135,930 B1* | 3/2012 | Mattox | G06F 3/0617 711/100 |
| 8,621,274 B1* | 12/2013 | Forgette | G06F 11/1484 714/10 |
| 11,099,956 B1* | 8/2021 | Polimera | G06F 9/45558 |
| 2020/0065135 A1* | 2/2020 | Balma | G06F 9/45558 |
| 2020/0110675 A1* | 4/2020 | Wang | G06F 11/2028 |
| 2021/0271691 A1* | 9/2021 | Patil | G06F 11/2048 |
| 2022/0027182 A1* | 1/2022 | Igelka | G06F 3/067 |
| 2023/0109510 A1* | 4/2023 | Polimera | G06F 11/1435 714/6.3 |
| 2023/0315530 A1* | 10/2023 | Igelka | G06F 9/45558 718/104 |

* cited by examiner

*Primary Examiner* — Yolanda L Wilson
(74) *Attorney, Agent, or Firm* — Holland & Hart LLP

(57) ABSTRACT

Some users of a data management system (DMS) may use multiple computing environments to replicate and store virtual machines (VM)s, such as for backup and recovery purposes. For example, different replication environments may include one or more private data centers, one or more cloud environments or any combination thereof. A user may schedule a failover procedure for an application. A DMS may perform a failover procedure that reduces downtime and eliminates data loss. The DMS may capture and replicate a snapshot of a VM running on a source computing environment to a target computing environment, power down the VM on the source computing environment, capture and replicate a second snapshot of the VM to the target computing environment, and power on the VM at the target computing environment. As the additional snapshot includes a relatively small amount of data replication at the target computing environment may proceed quickly, reducing downtime.

20 Claims, 10 Drawing Sheets

LOSSLESS FAILOVER FOR DATA RECOVERY

FIELD OF TECHNOLOGY

The present disclosure relates generally to data management, and more specifically to lossless failover for data recovery.

BACKGROUND

A data management system (DMS) may be employed to manage data associated with one or more computing systems. The data may be generated, stored, or otherwise used by the one or more computing systems, examples of which may include servers, databases, virtual machines, cloud computing systems, file systems (e.g., network-attached storage (NAS) systems), or other data storage or processing systems. The DMS may provide data backup, data recovery, data classification, or other types of data management services for data of the one or more computing systems. Improved data management may offer improved performance with respect to reliability, speed, efficiency, scalability, security, or ease-of-use, among other possible aspects of performance.

DETAILED DESCRIPTION

Figure 1:
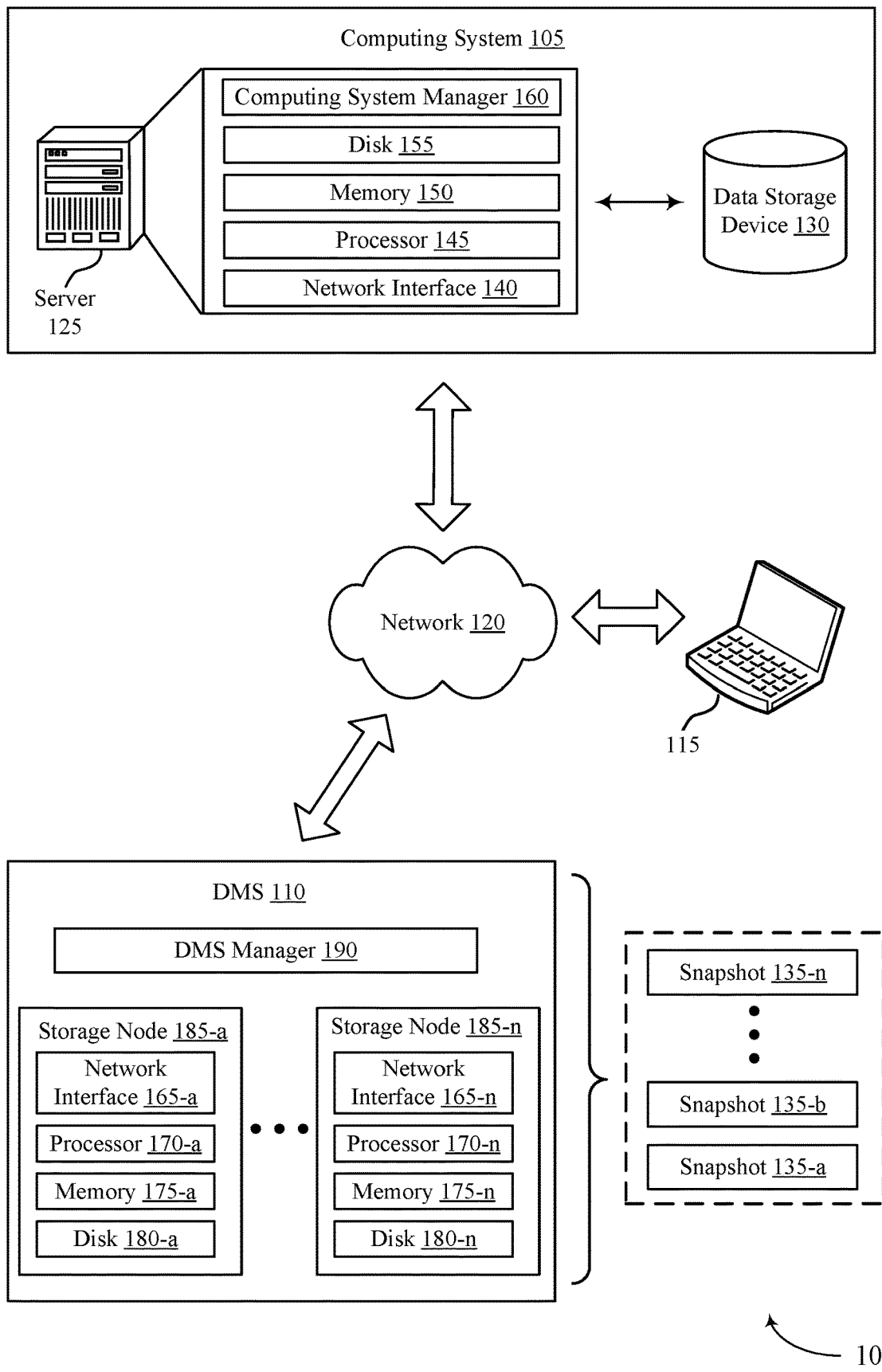
FIG. 1 illustrates an example of a data storage system that supports lossless failover for data recovery in accordance with aspects of the present disclosure.

Some customers or users of a data management system (DMS) may use multiple computing environments to replicate and store virtual machines (VM)s, such as for backup and recovery purposes. For example, different replication environments may include one or more private data centers, one or more cloud environments (e.g., with different vendors, such as Google Cloud Platform, Amazon Web Services, or Azure), or any combination thereof. Snapshots of a VM (e.g., a customer application) may be captured and stored at the different computing environments in accordance with a service level agreements (SLA)s. For example, an SLA may specify to the DMS, for a VM, how often (e.g., a frequency) snapshots are to be captured of the VM and to which computing environment(s) the snapshot(s) should be replicated.

In some examples, a customer may schedule a failover procedure for an application. A failover procedure refers to moving a live application from a source computing environment to a target computing environment. For example, one reason a customer may schedule a failover procedure is to verify that replication is operable between the computing environments, such as to ensure readiness for a potential disaster recovery scenario. Failover procedures may result in application downtime. In some cases, failover procedures may result in data loss due to new data written to an application at the source environment during the period between the time when the snapshot used for recovery was captured and the time when the application goes live on the target computing environment. In some cases, failover procedures may occur in response to a system failure at a source computing environment (e.g., a hardware failure), and a VM running at the failed source computing environment may be brought live at a target computing environment.

Aspects of the disclosure relate to a failover procedure that reduces downtime and reduces or eliminates data loss. A snapshot of an application (e.g., a snapshot of the VM running the application on a source computing environment) may be captured and replicated to a target computing environment. Once the snapshot of the VM has been replicated to the target computing environment, the VM running the application may be powered off at the source computing environment, and an additional snapshot of the VM may be captured after the VM has been powered down. The additional snapshot may include a relatively small amount of data, as the additional snapshot may be captured shortly after the first snapshot. For example, some snapshots may be incremental, and each snapshot captured for replication at a given target computing environment may include incremental data for the VM as compared to the prior snapshot (e.g., the data that has changed since the prior snapshot) for that target computing environment (e.g., as opposed to all of the data for that VM). The additional snapshot may be replicated to the target computing environment, and the VM running the application may then be powered on at the target computing environment. The VM at the target environment may accordingly run the user application. As the additional snapshot includes a relatively small amount of data (e.g., the changed data since the first snapshot), replication at the target computing environment may proceed quickly, and thus application downtime may be reduced. Further, the additional snapshot may capture data between the start of the failover procedure and the powering off of the VM at the source computing environment, thereby eliminating data loss due to the failover procedure.

Additionally, the DMS may calculate the latencies associated with failover procedures to different target computing environments at different times for a given VM. The DMS may calculate the latencies based on the throughput between the different target computing environments and the source computing environment and the data difference between the most recent snapshots stored on the different target computing environments and the current version of the VM (the application). The latencies may be presented to a user on a user interface (UI), for example, such that the user can select a time and/or target computing environment for performing a failover procedure with minimal downtime. In some examples, for a selected target computing environment, the DMS may suggest a time for a failover procedure (e.g., the time with the lowest estimated latency). In some examples, for a selected time, the DMS may suggest the best target environment for a failover procedure (e.g., the target computing environment with the lowest estimated/calculated latency).

Aspects of the disclosure are initially described in the context of an environment supporting an on-demand database service. Aspects of the disclosure are further illustrated by and described with reference to process flows, apparatus diagrams, system diagrams, and flowcharts that relate to lossless failover for data recovery.

FIG. 1 illustrates an example of a computing environment 100 that supports lossless failover for data recovery in accordance with aspects of the present disclosure. The computing environment 100 may include a computing system 105, a DMS 110, and one or more computing devices 115, which may be in communication with one another via a network 120. The computing system 105 may generate, store, process, modify, or otherwise use associated data, and the DMS 110 may provide one or more data management services for the computing system 105. For example, the DMS 110 may provide a data backup service, a data recovery service, a data classification service, a data transfer or replication service, one or more other data management services, or any combination thereof for data associated with the computing system 105.

The network 120 may allow the one or more computing devices 115, the computing system 105, and the DMS 110 to communicate (e.g., exchange information) with one another. The network 120 may include aspects of one or more wired networks (e.g., the Internet), one or more wireless networks (e.g., cellular networks), or any combination thereof. The network 120 may include aspects of one or more public networks or private networks, as well as secured or unsecured networks, or any combination thereof. The network 120 also may include any quantity of communications links and any quantity of hubs, bridges, routers, switches, ports or other physical or logical network components.

A computing device 115 may be used to input information to or receive information from the computing system 105, the DMS 110, or both. For example, a user of the computing device 115 may provide user inputs via the computing device 115, which may result in commands, data, or any combination thereof being communicated via the network 120 to the computing system 105, the DMS 110, or both. Additionally, or alternatively, a computing device 115 may output (e.g., display) data or other information received from the computing system 105, the DMS 110, or both. A user of a computing device 115 may, for example, use the computing device 115 to interact with one or more UIs (e.g., graphical user interfaces (GUIs)) to operate or otherwise interact with the computing system 105, the DMS 110, or both. Though one computing device 115 is shown in FIG. 1, it is to be understood that the computing environment 100 may include any quantity of computing devices 115.

A computing device 115 may be a stationary device (e.g., a desktop computer or access point) or a mobile device (e.g., a laptop computer, tablet computer, or cellular phone). In some examples, a computing device 115 may be a commercial computing device, such as a server or collection of servers. And in some examples, a computing device 115 may be a virtual device (e.g., a VM). Though shown as a separate device in the example computing environment of FIG. 1, it is to be understood that in some cases a computing device 115 may be included in (e.g., may be a component of) the computing system 105 or the DMS 110.

The computing system 105 may include one or more servers 125 and may provide (e.g., to the one or more computing devices 115) local or remote access to applications, databases, or files stored within the computing system 105. The computing system 105 may further include one or more data storage devices 130. Though one server 125 and one data storage device 130 are shown in FIG. 1, it is to be understood that the computing system 105 may include any quantity of servers 125 and any quantity of data storage devices 130, which may be in communication with one another and collectively perform one or more functions ascribed herein to the server 125 and data storage device 130.

A data storage device 130 may include one or more hardware storage devices operable to store data, such as one or more hard disk drives (HDDs), magnetic tape drives, solid-state drives (SSDs), storage area network (SAN) storage devices, or network-attached storage (NAS) devices. In some cases, a data storage device 130 may comprise a tiered data storage infrastructure (or a portion of a tiered data storage infrastructure). A tiered data storage infrastructure may allow for the movement of data across different tiers of the data storage infrastructure between higher-cost, higher-performance storage devices (e.g., SSDs and HDDs) and relatively lower-cost, lower-performance storage devices (e.g., magnetic tape drives). In some examples, a data storage device 130 may be a database (e.g., a relational database), and a server 125 may host (e.g., provide a database management system for) the database.

A server 125 may allow a client (e.g., a computing device 115) to download information or files (e.g., executable, text, application, audio, image, or video files) from the computing system 105, to upload such information or files to the computing system 105, or to perform a search query related to particular information stored by the computing system 105. In some examples, a server 125 may act as an application server or a file server. In general, a server 125 may refer to one or more hardware devices that act as the host in a client-server relationship or a software process that shares a resource with or performs work for one or more clients.

A server 125 may include a network interface 140, processor 145, memory 150, disk 155, and computing system manager 160. The network interface 140 may enable the server 125 to connect to and exchange information via the network 120 (e.g., using one or more network protocols). The network interface 140 may include one or more wireless network interfaces, one or more wired network interfaces, or any combination thereof. The processor 145 may execute computer-readable instructions stored in the memory 150 in order to cause the server 125 to perform functions ascribed herein to the server 125. The processor 145 may include one or more processing units, such as one or more central processing units (CPUs), one or more graphics processing units (GPUs), or any combination thereof. The memory 150 may comprise one or more types of memory (e.g., random access memory (RAM), static random access memory (SRAM), dynamic random access memory (DRAM), read-only memory (ROM), electrically erasable programmable read-only memory (EEPROM), Flash, etc.). Disk 155 may include one or more HDDs, one or more SSDs, or any combination thereof. Memory 150 and disk 155 may comprise hardware storage devices. The computing system manager 160 may manage the computing system 105 or aspects thereof (e.g., based on instructions stored in the memory 150 and executed by the processor 145) to perform functions ascribed herein to the computing system 105. In some examples, the network interface 140, processor 145, memory 150, and disk 155 may be included in a hardware layer of a server 125, and the computing system manager 160 may be included in a software layer of the server 125.

In some cases, the computing system manager 160 may be distributed across (e.g., implemented by) multiple servers 125 within the computing system 105.

In some examples, the computing system 105 or aspects thereof may be implemented within one or more cloud computing environments, which may alternatively be referred to as cloud environments. Cloud computing may refer to Internet-based computing, wherein shared resources, software, and/or information may be provided to one or more computing devices on-demand via the Internet. A cloud environment may be provided by a cloud platform, where the cloud platform may include physical hardware components (e.g., servers) and software components (e.g., operating system) that implement the cloud environment. A cloud environment may implement the computing system 105 or aspects thereof through Software-as-a-Service (SaaS) or Infrastructure-as-a-Service (IaaS) services provided by the cloud environment. SaaS may refer to a software distribution model in which applications are hosted by a service provider and made available to one or more client devices over a network (e.g., to one or more computing devices 115 over the network 120). IaaS may refer to a service in which physical computing resources are used to instantiate one or more VMs, the resources of which are made available to one or more client devices over a network (e.g., to one or more computing devices 115 over the network 120).

In some examples, the computing system 105 or aspects thereof may implement or be implemented by one or more VMs. The one or more VMs may run various applications, such as a database server, an application server, or a web server. For example, a server 125 may be used to host (e.g., create, manage) one or more VMs, and the computing system manager 160 may manage a virtualized infrastructure within the computing system 105 and perform management operations associated with the virtualized infrastructure. The computing system manager 160 may manage the provisioning of VMs running within the virtualized infrastructure and provide an interface to a computing device 115 interacting with the virtualized infrastructure. For example, the computing system manager 160 may be or include a hypervisor and may perform various VM-related tasks, such as cloning VMs, creating new VMs, monitoring the state of VMs, moving VMs between physical hosts for load balancing purposes, and facilitating backups of VMs. In some examples, the VMs, the hypervisor, or both, may virtualize and make available resources of the disk 155, the memory, the processor 145, the network interface 140, the data storage device 130, or any combination thereof in support of running the various applications. Storage resources (e.g., the disk 155, the memory 150, or the data storage device 130) that are virtualized may be accessed by applications as a virtual disk.

The DMS 110 may provide one or more data management services for data associated with the computing system 105 and may include DMS manager 190 and any quantity of storage nodes 185. The DMS manager 190 may manage operation of the DMS 110, including the storage nodes 185. Though illustrated as a separate entity within the DMS 110, the DMS manager 190 may in some cases be implemented (e.g., as a software application) by one or more of the storage nodes 185. In some examples, the storage nodes 185 may be included in a hardware layer of the DMS 110, and the DMS manager 190 may be included in a software layer of the DMS 110. In the example illustrated in FIG. 1, the DMS 110 is separate from the computing system 105 but in communication with the computing system 105 via the network 120. It is to be understood, however, that in some examples at least some aspects of the DMS 110 may be located within computing system 105. For example, one or more servers 125, one or more data storage devices 130, and at least some aspects of the DMS 110 may be implemented within the same cloud environment or within the same data center.

Storage nodes 185 of the DMS 110 may include respective network interfaces 165, processors 170, memories 175, and disks 180. The network interfaces 165 may enable the storage nodes 185 to connect to one another, to the network 120, or both. A network interface 165 may include one or more wireless network interfaces, one or more wired network interfaces, or any combination thereof. The processor 170 of a storage node 185 may execute computer-readable instructions stored in the memory 175 of the storage node 185 in order to cause the storage node 185 to perform processes described herein as performed by the storage node 185. A processor 170 may include one or more processing units, such as one or more CPUs, one or more GPUs, or any combination thereof. The memory 150 may comprise one or more types of memory (e.g., RAM, SRAM, DRAM, ROM, EEPROM, Flash, etc.). A disk 180 may include one or more HDDs, one or more SDDs, or any combination thereof. Memories 175 and disks 180 may comprise hardware storage devices. Collectively, the storage nodes 185 may in some cases be referred to as a storage cluster or as a cluster of storage nodes 185.

The DMS 110 may provide a backup and recovery service for the computing system 105. For example, the DMS 110 may manage the extraction and storage of snapshots 135 associated with different point-in-time versions of one or more target computing objects within the computing system 105. A snapshot 135 of a computing object (e.g., a VM, a database, a filesystem, a virtual disk, a virtual desktop, or other type of computing system or storage system) may be a file (or set of files) that represents a state of the computing object (e.g., the data thereof) as of a particular point in time. A snapshot 135 may also be used to restore (e.g., recover) the corresponding computing object as of the particular point in time corresponding to the snapshot 135. A computing object of which a snapshot 135 may be generated may be referred to as snappable. Snapshots 135 may be generated at different times (e.g., periodically or on some other scheduled or configured basis) in order to represent the state of the computing system 105 or aspects thereof as of those different times. In some examples, a snapshot 135 may include metadata that defines a state of the computing object as of a particular point in time. For example, a snapshot 135 may include metadata associated with (e.g., that defines a state of) some or all data blocks included in (e.g., stored by or otherwise included in) the computing object. Snapshots 135 (e.g., collectively) may capture changes in the data blocks over time. Snapshots 135 generated for the target computing objects within the computing system 105 may be stored in one or more storage locations (e.g., the disk 155, memory 150, the data storage device 130) of the computing system 105, in the alternative or in addition to being stored within the DMS 110, as described below.

To obtain a snapshot 135 of a target computing object associated with the computing system 105 (e.g., of the entirety of the computing system 105 or some portion thereof, such as one or more databases, VMs, or filesystems within the computing system 105), the DMS manager 190 may transmit a snapshot request to the computing system manager 160. In response to the snapshot request, the computing system manager 160 may set the target computing object into a frozen state (e.g., a read-only state). Setting the target computing object into a frozen state may allow a point-in-time snapshot 135 of the target computing object to be stored or transferred.

In some examples, the computing system 105 may generate the snapshot 135 based on the frozen state of the computing object. For example, the computing system 105 may execute an agent of the DMS 110 (e.g., the agent may be software installed at and executed by one or more servers 125), and the agent may cause the computing system 105 to generate the snapshot 135 and transfer the snapshot to the DMS 110 in response to the request from the DMS 110. In some examples, the computing system manager 160 may cause the computing system 105 to transfer, to the DMS 110, data that represents the frozen state of the target computing object, and the DMS 110 may generate a snapshot 135 of the target computing object based on the corresponding data received from the computing system 105.

Once the DMS 110 receives, generates, or otherwise obtains a snapshot 135, the DMS 110 may store the snapshot 135 at one or more of the storage nodes 185. The DMS 110 may store a snapshot 135 at multiple storage nodes 185, for example, for improved reliability. Additionally, or alternatively, snapshots 135 may be stored in some other location connected with the network 120. For example, the DMS 110 may store more recent snapshots 135 at the storage nodes 185, and the DMS 110 may transfer less recent snapshots 135 via the network 120 to a cloud environment (which may include or be separate from the computing system 105) for storage at the cloud environment, a magnetic tape storage device, or another storage system separate from the DMS 110. For example, snapshots 135 of a VM (e.g., an application) running on the computing system 105 may be stored at other computing systems or computing environments (e.g., a cloud environment or a private data center).

Updates made to a target computing object that has been set into a frozen state may be written by the computing system 105 to a separate file (e.g., an update file) or other entity within the computing system 105 while the target computing object is in the frozen state. After the snapshot 135 (or associated data) of the target computing object has been transferred to the DMS 110, the computing system manager 160 may release the target computing object from the frozen state, and any corresponding updates written to the separate file or other entity may be merged into the target computing object.

In response to a restore command (e.g., from a computing device 115 or the computing system 105), the DMS 110 may restore a target version (e.g., corresponding to a particular point in time) of a computing object based on a corresponding snapshot 135 of the computing object. In some examples, the corresponding snapshot 135 may be used to restore the target version based on data of the computing object as stored at the computing system 105 (e.g., based on information included in the corresponding snapshot 135 and other information stored at the computing system 105, the computing object may be restored to its state as of the particular point in time). Additionally, or alternatively, the corresponding snapshot 135 may be used to restore the data of the target version based on data of the computing object as included in one or more backup copies of the computing object (e.g., file-level backup copies or image-level backup copies). Such backup copies of the computing object may be generated in conjunction with or according to a separate schedule than the snapshots 135. For example, the target version of the computing object may be restored based on the information in a snapshot 135 and based on information included in a backup copy of the target object generated prior to the time corresponding to the target version. Backup copies of the computing object may be stored at the DMS 110 (e.g., in the storage nodes 185) or in some other location connected with the network 120 (e.g., in a cloud environment, which in some cases may be separate from the computing system 105).

In some examples, the DMS 110 may restore the target version of the computing object and transfer the data of the restored computing object to the computing system 105. And in some examples, the DMS 110 may transfer one or more snapshots 135 to the computing system 105, and restoration of the target version of the computing object may occur at the computing system 105 (e.g., as managed by an agent of the DMS 110, where the agent may be installed and operate at the computing system 105).

In response to a mount command (e.g., from a computing device 115 or the computing system 105), the DMS 110 may instantiate data associated with a point-in-time version of a computing object based on a snapshot 135 corresponding to the computing object (e.g., along with data included in a backup copy of the computing object) and the point-in-time. The DMS 110 may then allow the computing system 105 to read or modify the instantiated data (e.g., without transferring the instantiated data to the computing system). In some examples, the DMS 110 may instantiate (e.g., virtually mount) some or all of the data associated with the point-in-time version of the computing object for access by the computing system 105, the DMS 110, or the computing device 115.

In some examples, the DMS 110 may store different types of snapshots, including for the same computing object. For example, the DMS 110 may store both base snapshots 135 and incremental snapshots 135. A base snapshot 135 may represent the entirety of the state of the corresponding computing object as of a point in time corresponding to the base snapshot 135. An incremental snapshot 135 may represent the changes to the state—which may be referred to as the delta—of the corresponding computing object that have occurred between an earlier or later point in time corresponding to another snapshot 135 (e.g., another base snapshot 135 or incremental snapshot 135) of the computing object and the incremental snapshot 135. In some cases, some incremental snapshots 135 may be forward-incremental snapshots 135 and other incremental snapshots 135 may be reverse-incremental snapshots 135. To generate a full snapshot 135 of a computing object using a forward-incremental snapshot 135, the information of the forward-incremental snapshot 135 may be combined with (e.g., applied to) the information of an earlier base snapshot 135 of the computing object along with the information of any intervening forward-incremental snapshots 135, where the earlier base snapshot 135 may include a base snapshot 135 and one or more reverse-incremental or forward-incremental snapshots 135. To generate a full snapshot 135 of a computing object using a reverse-incremental snapshot 135, the information of the reverse-incremental snapshot 135 may be combined with (e.g., applied to) the information of a later base snapshot 135 of the computing object along with the information of any intervening reverse-incremental snapshots 135.

In some examples, the DMS 110 may provide a data classification service, a malware detection service, a data transfer or replication service, backup verification service, or any combination thereof, among other possible data management services for data associated with the computing system 105. For example, the DMS 110 may analyze data included in one or more computing objects of the computing system 105, metadata for one or more computing objects of the computing system 105, or any combination thereof, and based on such analysis, the DMS 110 may identify locations within the computing system 105 that include data of one or more target data types (e.g., sensitive data, such as data subject to privacy regulations or otherwise of particular interest) and output related information (e.g., for display to a user via a computing device 115). Additionally, or alternatively, the DMS 110 may detect whether aspects of the computing system 105 have been impacted by malware (e.g., ransomware). Additionally, or alternatively, the DMS 110 may relocate data or create copies of data based on using one or more snapshots 135 to restore the associated computing object within its original location or at a new location (e.g., a new location within a different computing system 105). Additionally, or alternatively, the DMS 110 may analyze backup data to ensure that the underlying data (e.g., user data or metadata) has not been corrupted. The DMS 110 may perform such data classification, malware detection, data transfer or replication, or backup verification, for example, based on data included in snapshots 135 or backup copies of the computing system 105, rather than live contents of the computing system 105, which may beneficially avoid adversely.

In some examples, multiple computing environments may be used to replicate and store VMs running on the computing system 105, such as for backup and recovery purposes. For example, different replication environments may include one or more private data centers, one or more cloud environments (e.g., with different vendors, such as Google Cloud Platform, Amazon Web Services, or Azure), or any combination thereof. Snapshots 135 of a VM (e.g., a customer application) may be captured and stored at the different environments in accordance with a SLA for the VM. For example, an SLA may specify for a VM to the DMS 110 how often (e.g., a frequency) snapshots 135 are to be captured of a VM and to which computing environment(s) the snapshot (s) should be replicated.

In some examples, a customer may schedule a failover procedure for a VM. Failover procedures may result in application downtime between the times when the VM is powered down on the computing system 105 and powered on at a target computing environment. The DMS 110 may perform a failover procedure that reduces downtime and reduces or eliminates data loss. A snapshot 135 of a VM on the computing system 105 may be captured by the DMS 110 and replicated to a target computing environment (e.g., a cloud computing environment or a private data center) via the network 120. Once the snapshot 135 of the VM has been replicated to the target computing environment, the VM (which may actively be running an application) may be powered off at the computing system 105, and the DMS 110 may capture an additional snapshot 135 of the VM after the VM has been powered down. The additional snapshot 135 may include a relatively small amount of data, as the additional snapshot 135 may be captured shortly after the first snapshot 135 (e.g., the delta may be small). The additional snapshot 135 may be replicated to the target computing environment, and the VM (running a live application) may then be powered on at the target computing environment. As the additional snapshot includes a relatively small amount of data (e.g., a small delta), replication at the target computing environment may proceed quickly, and thus application downtime may be reduced. Further, the additional snapshot 135 may capture data between the start of the failover procedure and the powering off of the VM at the computing system 105, thereby eliminating data loss due to the failover procedure.

Additionally, the DMS 110 may calculate the latencies associated with failover procedures to different target computing environments at different times for a given VM running on the computing system 105. The DMS 110 may calculate the latencies based on the throughput between the different target computing environments and the computing system 105 (e.g., the speed of a communication channel of the network 120 between the different target computing environments and the computing system 105) and the data difference between the most recent snapshots 135 stored on the different target computing environments and the current version of the VM (the application). The latencies may be presented to a user on a UI (e.g., via the computing device 115), for example, such that the user can select a time and/or target computing environment for performing a failover procedure with minimal downtime. In some examples, for a selected target computing environment, the DMS may suggest a time for a failover procedure (e.g., the time with the lowest estimated latency). In some examples, for a selected time, the DMS 110 may suggest the best target computing environment for a failover procedure (e.g., the target computing environment with the lowest estimated latency).

Figure 2:
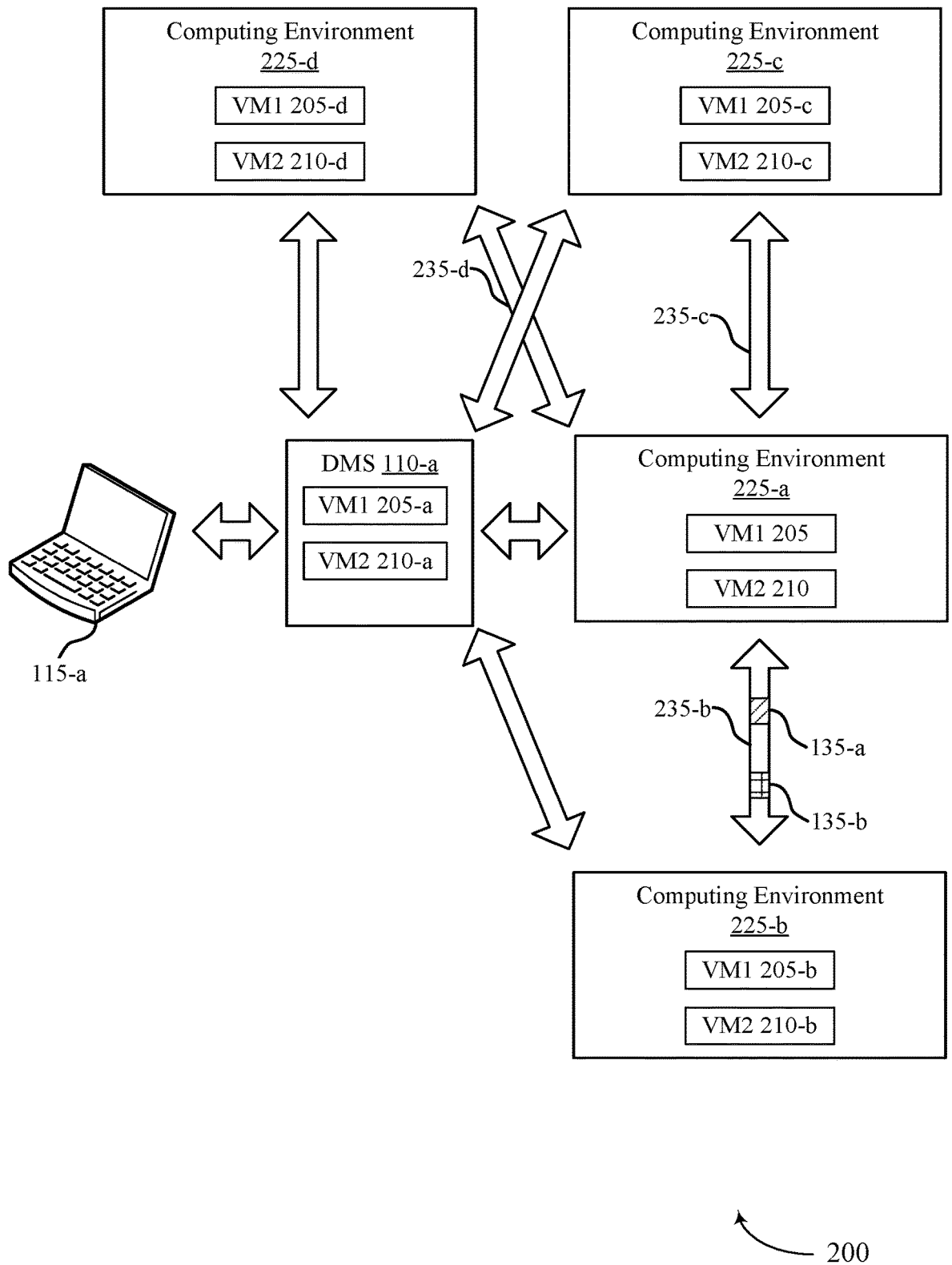
FIG. 2 illustrates an example of a computing environment that supports lossless failover for data recovery in accordance with aspects of the present disclosure.

FIG. 2 illustrates an example of a computing environment 200 that supports lossless failover for data recovery in accordance with aspects of the present disclosure. The computing environment may implement aspects of or may be implemented by aspects of the computing environment 100. For example, the computing environment 200 may include DMS 110-a, which may be an example of a DMS 110 as described herein. The computing environment 200 may include a computing device 115-a, which may be an example of a computing device 115 as described herein.

A customer may use multiple computing environments (e.g., a first computing environment 225-a, a second computing environment 225-b, a third computing environment 225-c, and a fourth computing environment 225-d). For example, the first computing environment 225-a may correspond to a computing system 105 as described herein, and the second computing environment 225-b, the third computing environment 225-c, and/or the fourth computing environment 225-d may be a computing system 105, a cloud computing environment, a private data center, or a combination thereof.

The DMS 110-a may communicate with each of the first computing environment 225-a, the second computing environment 225-b, the third computing environment 225-c, and the fourth computing environment 225-d, for example via a network 120 as described with reference to FIG. 1. In some examples, the DMS 110-a may run software on each of the first computing environment 225-a, the second computing environment 225-b, the third computing environment 225-c, and the fourth computing environment 225-d that may manage and/or track versions of VMs and snapshots of VMs stored and/or running on the first computing environment 225-a, the second computing environment 225-b, the third computing environment 225-c, and the fourth computing environment 225-d.

The DMS 110-a may communicate with a computing devices 115-a via a network (e.g., via a network 120 as described with reference to FIG. 1). The computing device 115-a may include a UI via which a user is able to interact with the DMS 110-a.

One or more VMs (e.g., applications) may run at the first computing environment 225-a (e.g., a first VM 205 and a second VM 210). Snapshots of the first VM 205 and/or the second VM 210 may be stored at the second computing environment 225-b, the third computing environment 225-c, and the fourth computing environment 225-d in accordance with SLAs for the first VM 205 and the second VM 210. For example, a first SLA may specify for the first VM 205 a frequency at which to capture snapshots of the first VM and to which of the second computing environment 225-b, the third computing environment 225-c, and the fourth computing environment 225-d the snapshots should be stored. Similarly, a second SLA may specify for the second VM 210 a frequency at which to capture snapshots of the second VM 210 and to which of the second computing environment 225-b, the third computing environment 225-c, and the fourth computing environment 225-d the snapshots should be stored. For example, snapshots the first VM 205-b may be stored at the second computing environment 225-b, snapshots the first VM 205-c may be stored at the third computing environment 225-c, snapshots the first VM 205-d may be stored at the fourth computing environment 225-d, snapshots the second VM 210-b may be stored at the second computing environment 225-b, snapshots the second VM 210-c may be stored at the third computing environment 225-c, snapshots the second VM 210-d may be stored at the fourth computing environment 225-d.

The DMS 110-a may capture the snapshots (e.g., snapshots of the first VM 205-a and snapshots of the second VM 210-a) and replicate the snapshots to one or more of the second computing environment 225-b, the third computing environment 225-c, and the fourth computing environment 225-d in accordance with the SLAs for the first VM 205 and the second VM 210.

In some examples, a customer may schedule a failover procedure for a VM. For example, for a failover procedure for the first VM 205 from the first computing environment 225-a to the second computing environment 225-b, the first VM 205 may be powered off at the first computing environment 225-a and the first VM 205-b may be powered on at the second computing environment 225-b (referred to as the target computing environment). Failover procedures may result in application downtime between the times when the VM is powered down on the source computing environment and powered on at the target computing environment.

For example, in some aspects, to conduct a failover procedure, a user, via a computing device 115-a (or the DMS 110-a autonomously), may select a target computing environment (e.g., the second computing environment 225-b) for performing a failover procedure for the first VM 205 on the first computing environment 225-a (the source computing environment). The user, via a computing device 115-a (or the DMS 110-a autonomously), the DMS 110-a may select a resources on the target computing environment (e.g., the second computing environment 225-b) for recovery of the first VM 205. The DMS 110-a may assign an SLA for protection and replication of the first VM 205. The DMS 110-a may capture and replicate snapshots of the first VM 205 on the first computing environment 225-a to the second computing environment 225-b in accordance with the SLAs. Once the snapshot of the first VM 205-a is replicated to the second computing environment 225-b, the DMS 110-a may start a recovery workflow. The first VM 205 may then be powered off at the first computing environment 225-a.

In some aspects, a user may use a continuous data protection (CDP) based recovery system (also known as continuous backup), where the DMS 110-a backs up data (e.g., backs up the first VM 205) any time a change is made to the VM. For example, in a CDP based system. the DMS 110-a may continuously update the backup of the first VM 205-b at the second computing environment 225-b to match the first VM 205 at the first computing environment 225-a. Some systems may not have a CDP based recovery system in place on the source computing environment or the target computing environment. If a CDP based recovery system is in place at the first computing environment 225-a and the second computing environment 225-b, the recovery may be completed from any point in time within the CDP range.

Once the first VM 205 is powered off at the first computing environment 225-a, data for the VM may be transferred to the second computing environment 225-b. The first VM 205-b may then be powered on at the second computing environment 225-b (e.g., an application run by the first VM 205-b may be run on the second computing environment 225-b). If CDP is not enabled, and the application (e.g., the first VM 205) is subject to a failover procedure while the application is live, data may be lost if the first VM 205 is not powered off at the source prior to the snapshot of the first VM 205 being captured. Additionally, if the VM is powered off prior to the snapshot being captured, a large application down time may occur due to the time to capture the snapshot of the first VM 205 and replicate the snapshot to the second computing environment 225-b.

In some aspects, the DMS 110-a may perform a failover procedure that reduces downtime and reduces or eliminates data loss. For example, the DMS 110-a may capture a first snapshot 135-a of the first VM 205 on the first computing environment 225-a (e.g., in accordance with an SLA). The DMS 110-a may replicate the first snapshot 135-a to a target computing environment (e.g., the second computing environment 225-b). Once the first snapshot 135-a of the first VM 205 has been replicated to the second computing environment 225-b, the first VM 205 running the application may be powered off at the first computing environment 225-a, and the DMS 110-a may capture an additional snapshot 135-b of the first VM 205 after the first VM 205 has been powered down. The additional snapshot 135-b may include a relatively small amount of data, as the additional snapshot 135-b may be captured shortly after the first snapshot 135-a (e.g., the delta between the first snapshot 135-a and the additional snapshot 135-b may be small). The DMS 110-a may replicate the additional snapshot 135-b to the second computing environment 225-b, and the first VM 205-b may be powered on at the second computing environment 225-b. As the additional snapshot 135-b includes a relatively small amount of data (e.g., a small delta), replication at the target computing environment may proceed quickly, and thus application downtime may be reduced. Further, the additional snapshot 135-b may capture data between the start of the failover procedure and the powering off of the first VM 205 at the first computing environment 225-a, thereby eliminating data loss due to the failover procedure.

The DMS 110-a may be aware of the throughput rate of data between the different computing environments (e.g., the communications channel 235-b between the first computing environment 225-a and the second computing environment 225-b, the communications channel 235-c between the first computing environment 225-a and the third computing environment 225-c, and the communications channel 235-d between the first computing environment 225-a and the fourth computing environment 225-d). Based on SLAs for the VMs (e.g., the first VM 205 and the second VM 210), the DMS 110-a may also be aware of the timing of the last snapshot of each VM (e.g., the first VM 205 and the second VM 210) that has been replicated to each computing environment and/or the schedule of future snapshots that will be replicated to each target computing environment (e.g., the second computing environment 225-b, the third computing environment 225-c, and the fourth computing environment 225-d). The DMS 110-a may track the amount of data (e.g., the respective deltas) that has been changed for each VM (e.g., the first VM 205 and the second VM 210) since the last snapshot for each target computing environment (e.g., the second computing environment 225-b, the third computing environment 225-c, and the fourth computing environment 225-d). Based on the throughput rates of the communications channels and the respective deltas, the DMS 110-a may calculate latencies associated with failover procedures with the different targeting computing environments (e.g., at the current time and/or estimated latencies at times in the future).

In some examples, the estimated or calculated latencies for the target computing environments may be presented on a UI (e.g., of the computing device 115-a). In some examples, a user may select a target computing environment (e.g., the second computing environment 225-b, the third computing environment 225-c, and the fourth computing environment 225-d) and or a starting time for a failover procedure based on the presented latencies. In some examples, a user may select a starting time for a failover procedure, and the DMS 110-a may suggest, via a UI of the computing device 115-a, a target computing environment (e.g., the one of the second computing environment 225-b, the third computing environment 225-c, or the fourth computing environment 225-d with the lowest estimated latency at the selected starting time). In some examples, a user may select a starting time for a failover procedure, and the DMS 110-a may automatically select a target computing environment based on the selected starting time (e.g., the one of the second computing environment 225-b, the third computing environment 225-c, or the fourth computing environment 225-d with the lowest estimated latency at the selected starting time). The starting time of a failover procedure may correspond to the time when the first snapshot 135-a of the first VM 205 is captured for replication to the target computing environment.

In some examples, a user may select a target computing environment (e.g., one of the second computing environment 225-b, the third computing environment 225-c, or the fourth computing environment 225-d), and the DMS 110-a may suggest, based on the determined latencies, a starting time for the failover procedure to that target computing environment. In some examples, a user may select a target computing environment (e.g., one of the second computing environment 225-b, the third computing environment 225-c, or the fourth computing environment 225-d), and the DMS 110-a may automatically select, based on the determined latencies, a starting time for the failover procedure to that target computing environment.

In some cases, failover procedures may occur in response to a system failure at a source computing environment (e.g., a hardware failure), and a VM running at the failed source computing environment may be brought live at a target computing environment. For example, the DMS 110-a may detect a hardware failure at the first computing environment 225-a. The DMS 110-a may determine a best target computing environment at the time of the detected hardware failure (e.g., the target computing environment with the lowest latency for a failover procedure at the time of the detected hardware failure). The DMS 110-a may initiate a failover procedure to the determined best target computing environment based on the detected hardware failure.

Figure 3:
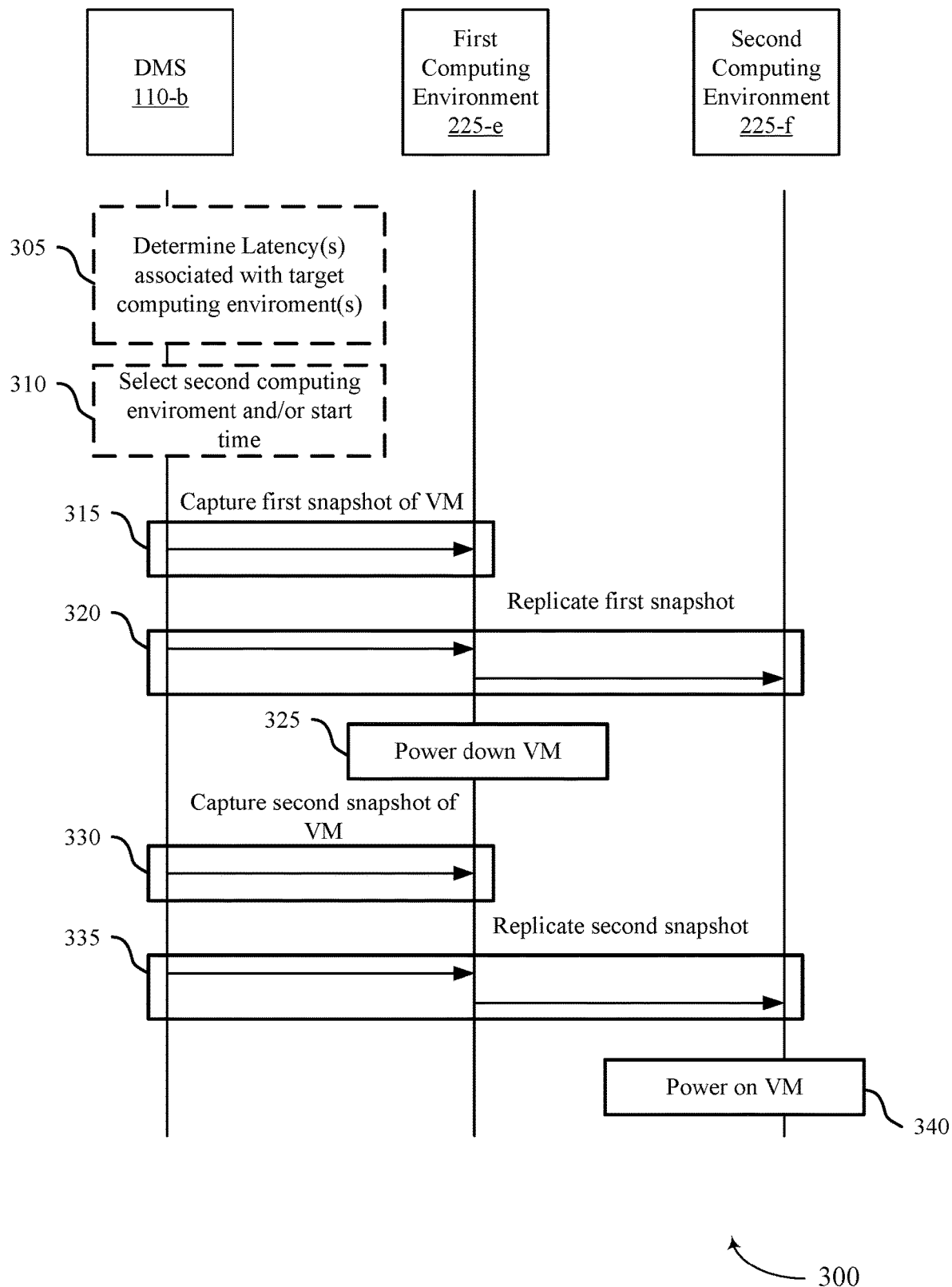
FIG. 3 illustrates an example of a process flow that supports lossless failover for data recovery in accordance with aspects of the present disclosure.

FIG. 3 illustrates an example of a process flow 300 that supports lossless failover for data recovery in accordance with aspects of the present disclosure. The process flow 300 may include a DMS 110-b, which may be an example of a DMS 110 as described herein. The process flow 300 may include a first computing environment 225-e and a second computing environment 225-f, which may be examples of a computing environments 225 as described herein. In the following description of the process flow 300, the operations between the DMS 110-b, the first computing environment 225-e, and the second computing environment 225-f may be transmitted in a different order than the example order shown, or the operations performed by the DMS 110-b, the first computing environment 225-e, and the second computing environment 225-f may be performed in different orders or at different times. Some operations may also be omitted from the process flow 300, and other operations may be added to the process flow 300.

At 315, the DMS 110-b may capture a first snapshot of a VM running at the first computing environment 225-e.

At 320, the DMS 110-b may replicate (e.g., transfer a copy of) the first snapshot to the second computing environment 225-f while the VM is running at the first computing environment 225-e.

At 325, the VM may be powered down at the first computing environment 225-e after the completion of replication of the first snapshot to the second computing environment 225-f.

At 330, the DMS 110-b may capture a second snapshot of the VM after the VM is powered down at the first computing environment 225-e. The second snapshot corresponds to a powered down state of the VM.

At 335, the DMS 110-b may replicate the second snapshot to the second computing environment 225-f.

At 340, the VM may be powered on at the second computing environment 225-f. For example, if the VM runs an application, the application may run at the second computing environment 225-f.

In some examples, prior to 315, at 305, the DMS 110-b may determine latencies associated with different target computing environments and/or with different starting times of the failover procedure of the process flow 300. In such examples, at 310, the DMS 110-b may select the second computing environment 225-f from the multiple different target computing environments and/or a starting time for the failover procedure corresponding to the time when the first snapshot is captured at 315.

For example, at 305, the DMS 110-b may determine latencies of different starting times for a failover procedure of the VM from the first computing environment 225-e to the second computing environment 225-f. In some examples, the DMS 110-a may present, via a UI, the latencies and the different starting times, and the DMS 110-a may receive, via the UI, an indication of a selected starting time, and the first snapshot is captured at 315 at the selected starting time. In some examples, the DMS 110-a may receive, via a UI, an indication to initiate the failover procedure of the VM from the first computing environment to the second computing environment, and the DMS 110-b may select a starting time of the different starting times for the failover procedure based on the determined latencies, and the first snapshot is captured at 315 at the selected starting time. In some examples, the DMS 110-b may receive, via a UI, an indication to initiate the failover procedure of the VM from the first computing environment to the second computing environment, and the DMS 110-b may present, via the UI, a suggested starting time for the failover procedure based on the determined latencies. A user may then select the suggested starting time or a different starting time for the failover procedure. In some examples, the latencies may be determined based on a throughput rate of data between the first computing environment 225-e and the second computing environment 225-f, a schedule of backups of the VM, or any combination thereof.

As another example, at 305, the DMS 110-b may determine latencies associated with a set of multiple computing environments for a failover procedure of the VM from the first computing environment 225-e to the set of multiple computing environments, the set of multiple computing environments including the second computing environment 225-f. In some examples, the DMS 110-b may present, via a UI, the latencies and the set of multiple computing environments, and the DMS 110-b may receive, via the UI, a selection of the second computing environment 225-b. Replicating the first snapshot to the second computing environment 225-f at 320 may be based on the selection. In some examples, the DMS 110-b may receive, via a UI, an indication to initiate the failover procedure of the VM from the first computing environment 225-e to one of the set of multiple computing environments at an indicated starting time. The DMS 110-b may present, via the UI, a suggested computing environment (e.g., the second computing environment 225-f) of the set of multiple computing environments for the failover procedure based on the determined latencies and the indicated starting time. In some examples, the latencies may be determined based on respective throughput rates of data between the first computing environment 225-e and the set of multiple computing environments, respective schedules of backups of the VM, or any combination thereof.

In some examples, the DMS 110-b may detect a hardware failure at the first computing environment 225-e. The DMS 110-b may select the second computing environment 225-f from the set of multiple computing environments based on the determined latencies (e.g., the latency associated with a failover procedure to the second computing environment 225-f may be the lowest at the time of the hardware failure). The DMS 110-b may initiate capturing the first snapshot at 315 based on the detected hardware failure.

Figure 4:
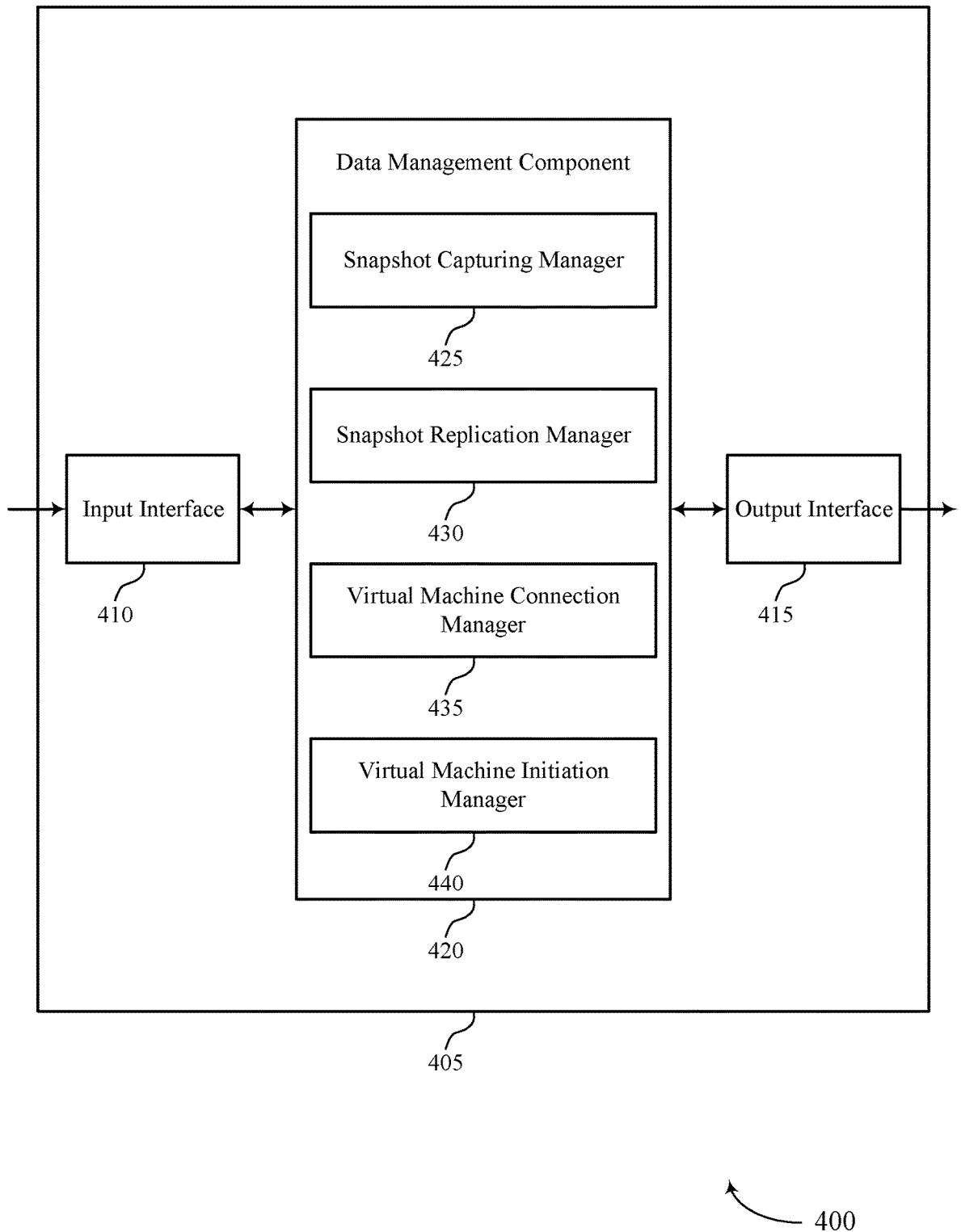
FIG. 4 shows a block diagram of an apparatus that supports lossless failover for data recovery in accordance with aspects of the present disclosure.

FIG. 4 shows a block diagram 400 of a device 405 that supports lossless failover for data recovery in accordance with aspects of the present disclosure. The device 405 may include an input interface 410, an output interface 415, and a data management component 420. The device 405 may also include a processor. Each of these components may be in communication with one another (e.g., via one or more buses).

The input interface 410 may manage input signals for the device 405. For example, the input interface 410 may identify input signals based on an interaction with a modem, a keyboard, a mouse, a touchscreen, or a similar device. These input signals may be associated with user input or processing at other components or devices. In some cases, the input interface 410 may utilize an operating system such as iOS®, ANDROID®, MS-DOS®, MS-WINDOWS®, OS/2®, UNIX®, LINUX®, or another known operating system to handle input signals. The input interface 410 may send aspects of these input signals to other components of the device 405 for processing. For example, the input interface 410 may transmit input signals to the data management component 420 to support lossless failover for data recovery. In some cases, the input interface 410 may be a component of network interface 615 as described with reference to FIG. 6.

The output interface 415 may manage output signals for the device 405. For example, the output interface 415 may receive signals from other components of the device 405, such as the data management component 420, and may transmit these signals to other components or devices. In some examples, the output interface 415 may transmit output signals for display in a UI, for storage in a database or data store, for further processing at a server or server cluster, or for any other processes at any number of devices or systems. In some cases, the output interface 415 may be a component of a network interface 615 as described with reference to FIG. 6.

For example, the data management component 420 may include a snapshot capturing manager 425, a snapshot replication manager 430, a VM connection manager 435, a VM initiation manager 440, or any combination thereof. In some examples, the data management component 420, or various components thereof, may be configured to perform various operations (e.g., receiving, monitoring, transmitting) using or otherwise in cooperation with the input interface 410, the output interface 415, or both. For example, the data management component 420 may receive information from the input interface 410, send information to the output interface 415, or be integrated in combination with the input interface 410, the output interface 415, or both to receive information, transmit information, or perform various other operations as described herein.

The snapshot capturing manager 425 may be configured as or otherwise support a means for capturing, by a DMS, a first snapshot of a VM running at a first computing environment. The snapshot replication manager 430 may be configured as or otherwise support a means for replicating, by the DMS, the first snapshot to a second computing environment while the VM is running at the first computing environment. The VM connection manager 435 may be configured as or otherwise support a means for powering down the VM at the first computing environment subsequent to completion of replicating the first snapshot to the second computing environment. The snapshot capturing manager 425 may be configured as or otherwise support a means for capturing, by the DMS subsequent to powering down the VM at the first computing environment, a second snapshot of the VM corresponding to a powered down state of the VM. The snapshot replication manager 430 may be configured as or otherwise support a means for replicating, by the DMS, the second snapshot to the second computing environment. The VM initiation manager 440 may be configured as or otherwise support a means for powering on the VM at the second computing environment based on the first snapshot and the second snapshot.

Figure 5:
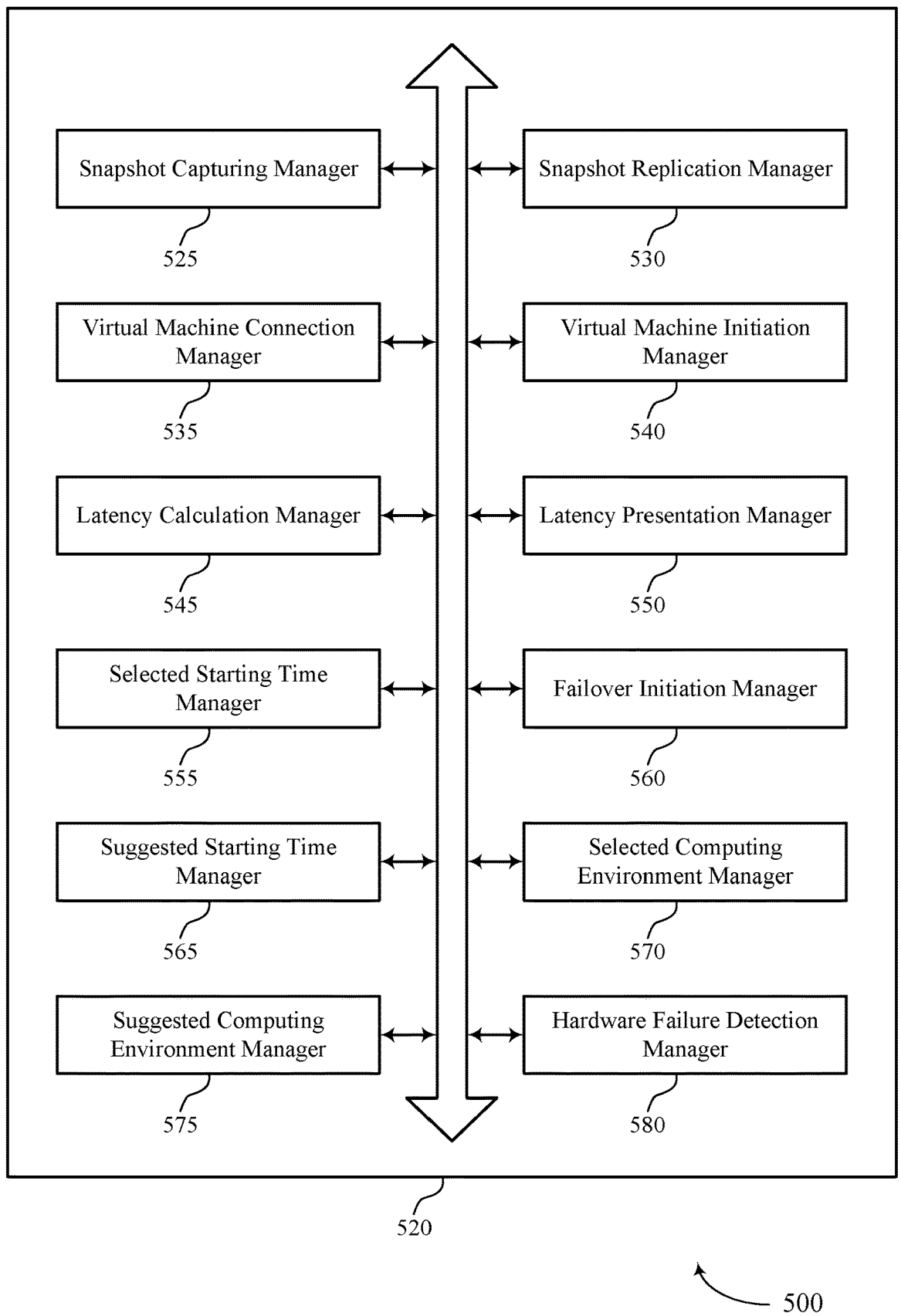
FIG. 5 shows a block diagram of a [[Name Primary Component]] that supports lossless failover for data recovery in accordance with aspects of the present disclosure.

FIG. 5 shows a block diagram 500 of a data management component 520 that supports lossless failover for data recovery in accordance with aspects of the present disclosure. The data management component 520 may be an example of aspects of a data management component 420, described herein. The data management component 520, or various components thereof, may be an example of means for performing various aspects of lossless failover for data recovery as described herein. For example, the data management component 520 may include a snapshot capturing manager 525, a snapshot replication manager 530, a VM connection manager 535, a VM initiation manager 540, a latency calculation manager 545, a latency presentation manager 550, a selected starting time manager 555, a failover initiation manager 560, a suggested starting time manager 565, a selected computing environment manager 570, a suggested computing environment manager 575, a hardware failure detection manager 580, or any combination thereof. Each of these components may communicate, directly or indirectly, with one another (e.g., via one or more buses).

The snapshot capturing manager 525 may be configured as or otherwise support a means for capturing, by a DMS, a first snapshot of a VM running at a first computing environment. The snapshot replication manager 530 may be configured as or otherwise support a means for replicating, by the DMS, the first snapshot to a second computing environment while the VM is running at the first computing environment. The VM connection manager 535 may be configured as or otherwise support a means for powering down the VM at the first computing environment subsequent to completion of replicating the first snapshot to the second computing environment. In some examples, the snapshot capturing manager 525 may be configured as or otherwise support a means for capturing, by the DMS subsequent to powering down the VM at the first computing environment, a second snapshot of the VM corresponding to a powered down state of the VM. In some examples, the snapshot replication manager 530 may be configured as or otherwise support a means for replicating, by the DMS, the second snapshot to the second computing environment. The VM initiation manager 540 may be configured as or otherwise support a means for powering on the VM at the second computing environment based on the first snapshot and the second snapshot.

In some examples, the latency calculation manager 545 may be configured as or otherwise support a means for determining, by the DMS, latencies of different starting times for a failover procedure of the VM from the first computing environment to the second computing environment.

In some examples, the latency presentation manager 550 may be configured as or otherwise support a means for presenting, via a UI, the latencies and the different starting times. In some examples, the selected starting time manager 555 may be configured as or otherwise support a means for receiving, via the UI, an indication of a selected starting time, where the first snapshot is captured at the selected starting time.

In some examples, the failover initiation manager 560 may be configured as or otherwise support a means for receiving, via a UI, an indication to initiate the failover procedure of the VM from the first computing environment to the second computing environment. In some examples, the selected starting time manager 555 may be configured as or otherwise support a means for selecting, by the DMS, a starting time of the different starting times for the failover procedure based on the determined latencies, where the first snapshot is captured at the selected starting time.

In some examples, the failover initiation manager 560 may be configured as or otherwise support a means for receiving, via a UI, an indication to initiate the failover procedure of the VM from the first computing environment to the second computing environment. In some examples, the suggested starting time manager 565 may be configured as or otherwise support a means for presenting, via the UI, a suggested starting time for the failover procedure based on the determined latencies.

In some examples, to support determining the latencies, the latency calculation manager 545 may be configured as or otherwise support a means for determining the latencies based on a throughput rate of data between the first computing environment and the second computing environment, a schedule of backups of the VM, or any combination thereof.

In some examples, the latency calculation manager 545 may be configured as or otherwise support a means for determining, by the DMS, latencies associated with a set of multiple computing environments for a failover procedure of the VM from the first computing environment to the set of multiple computing environments, the set of multiple computing environments including the second computing environment.

In some examples, the latency presentation manager 550 may be configured as or otherwise support a means for presenting, via a UI, the latencies and the set of multiple computing environments. In some examples, the selected computing environment manager 570 may be configured as or otherwise support a means for receiving, via the UI, a selection of the second computing environment, where replicating the first snapshot to the second computing environment is based on the selection.

In some examples, the selected starting time manager 555 may be configured as or otherwise support a means for receiving, via a UI, an indication to initiate the failover procedure of the VM from the first computing environment to one of the set of multiple computing environments at an indicated starting time. In some examples, the suggested computing environment manager 575 may be configured as or otherwise support a means for presenting, via the UI, a suggested computing environment of the set of multiple computing environments for the failover procedure based on the determined latencies and the indicated starting time.

In some examples, to support determining the latencies, the latency calculation manager 545 may be configured as or otherwise support a means for determining the latencies based on respective throughput rates of data between the first computing environment and the set of multiple computing environments, respective schedules of backups of the VM, or any combination thereof.

In some examples, the hardware failure detection manager 580 may be configured as or otherwise support a means for detecting a hardware failure at the first computing environment. In some examples, the selected computing environment manager 570 may be configured as or otherwise support a means for selecting the second computing environment from the set of multiple computing environments based on the determined latencies. In some examples, the snapshot capturing manager 525 may be configured as or otherwise support a means for initiating capturing the first snapshot based on the detected hardware failure.

In some examples, to support replicating the first snapshot to the second computing environment, the snapshot replication manager 530 may be configured as or otherwise support a means for copying the first snapshot from the first computing environment to the second computing environment.

Figure 6:
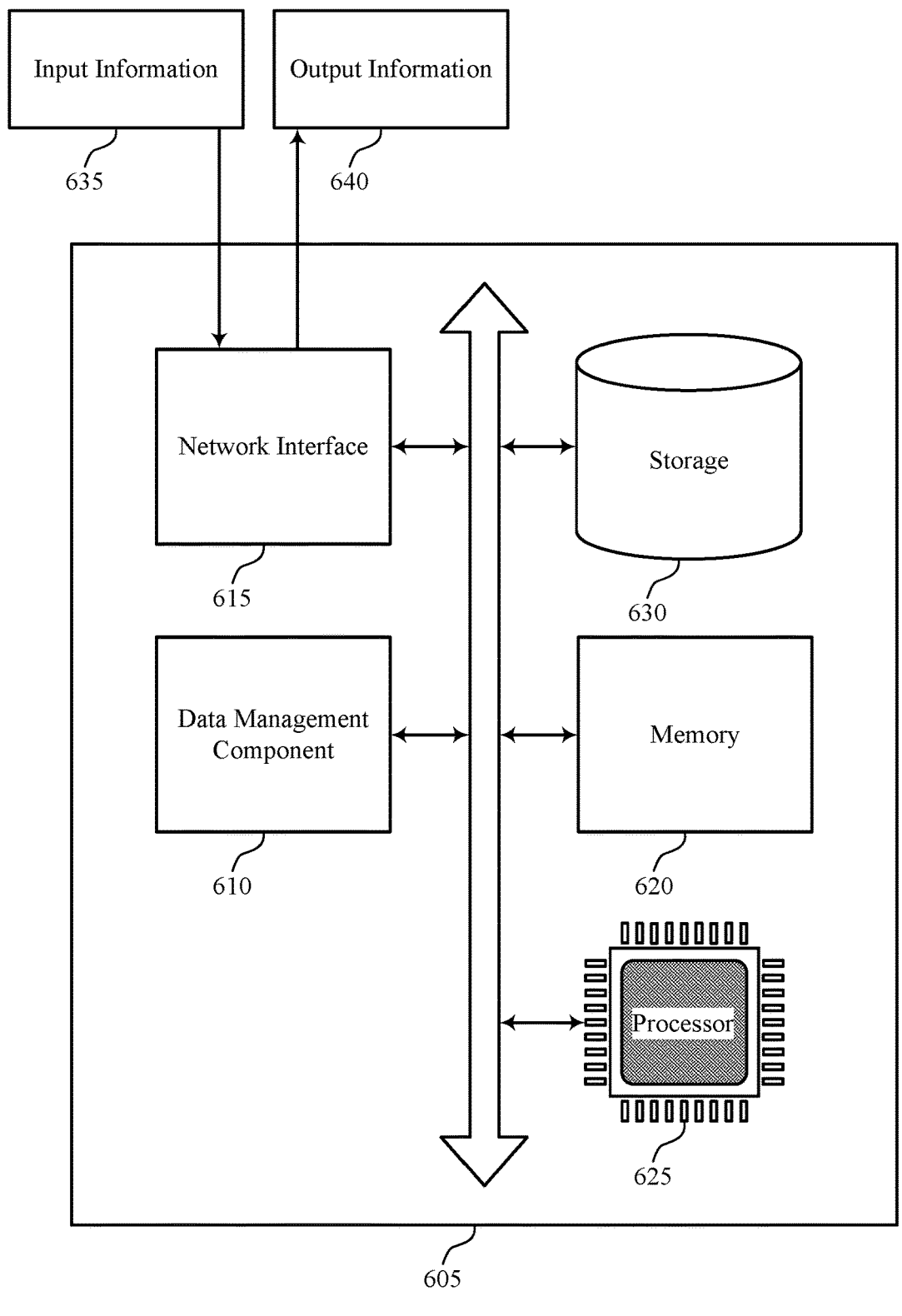
FIG. 6 shows a diagram of a system including a device that supports lossless failover for data recovery in accordance with aspects of the present disclosure.

FIG. 6 shows a diagram of a system 600 including a device 605 that supports lossless failover for data recovery in accordance with aspects of the present disclosure.

The device 605 may be an example of or include aspects of a device 405 as described herein. The device 605 may include components for data management, including components such as a data management component 610, a network interface 615, memory 620, processor 625, and storage 630. These components may be in electronic communication or otherwise coupled with each other (e.g., operatively, communicatively, functionally, electronically, electrically; via one or more buses, communications links, communications interfaces, or any combination thereof). Additionally, the components of the device 605 may comprise corresponding physical components or may be implemented as corresponding virtual components (e.g., components of one or more VMs). In some examples, the device 605 may be an example of aspects of one or more components described with reference to FIG. 1, such as a DMS 110.

The network interface 615 may enable the device 605 to exchange information (e.g., input information 635, output information 640, or both) with other systems or devices (not shown). For example, the network interface 615 may enable the device 605 to connect to a network (e.g., a network 120 as described herein). The network interface 615 may include one or more wireless network interfaces, one or more wired network interfaces, or any combination thereof. In some examples, the network interface 615 may be an example of may be an example of aspects of one or more components described with reference to FIG. 1, such as one or more network interfaces 165.

Memory 620 may include RAM, ROM, or both. The memory 620 may store computer-readable, computer-executable software including instructions that, when executed, cause the processor 625 to perform various functions described herein. In some cases, the memory 620 may contain, among other things, a basic input/output system (BIOS), which may control basic hardware or software operation such as the interaction with peripheral components or devices. In some cases, the memory 620 may be an example of aspects of one or more components described with reference to FIG. 1, such as one or more memories 175.

The processor 625 may include an intelligent hardware device, (e.g., a general-purpose processor, a digital signal processor (DSP), a CPU, a microcontroller, an application-specific integrated circuit (ASIC), a field programmable gate array (FPGA), a programmable logic device, a discrete gate or transistor logic component, a discrete hardware component, or any combination thereof). The processor 625 may be configured to execute computer-readable instructions stored in a memory 620 to perform various functions (e.g., functions or tasks supporting archiving computing snapshots to multiple locations in accordance with an SLA). Though a single processor 625 is depicted in the example of FIG. 6, it is to be understood that the device 605 may include any quantity of one or more of processors 625 and that a group of processors 625 may collectively perform one or more functions ascribed herein to a processor, such as the processor 625. In some cases, the processor 625 may be an example of aspects of one or more components described with reference to FIG. 1, such as one or more processors 170.

Storage 630 may be configured to store data that is generated, processed, stored, or otherwise used by the device 605. In some cases, the storage 630 may include one or more HDDs, one or more SDDs, or both. In some examples, the storage 830 may be an example of a single database, a distributed database, multiple distributed databases, a data store, a data lake, or an emergency backup database. In some examples, the storage 630 may be an example of one or more components described with reference to FIG. 1, such as one or more network disks 180.

For example, the data management component 610 may be configured as or otherwise support a means for capturing a first snapshot of a VM running at a first computing environment. The data management component 610 may be configured as or otherwise support a means for replicating the first snapshot to a second computing environment while the VM is running at the first computing environment. The data management component 610 may be configured as or otherwise support a means for powering down the VM at the first computing environment subsequent to completion of replicating the first snapshot to the second computing environment. The data management component 610 may be configured as or otherwise support a means for capturing, subsequent to powering down the VM at the first computing environment, a second snapshot of the VM corresponding to a powered down state of the VM. The data management component 610 may be configured as or otherwise support a means for replicating the second snapshot to the second computing environment. The data management component 610 may be configured as or otherwise support a means for powering on the VM at the second computing environment based on the first snapshot and the second snapshot.

By including or configuring the data management component 610 in accordance with examples as described herein, the device 605 may support techniques for determining a starting time and/or target computing environment for a failover procedure, which may provide one or more benefits such as, for example, improved reliability, reduced latency, improved user experience, more efficient utilization of computing resources, network resources or both, among other possibilities.

Figure 7:
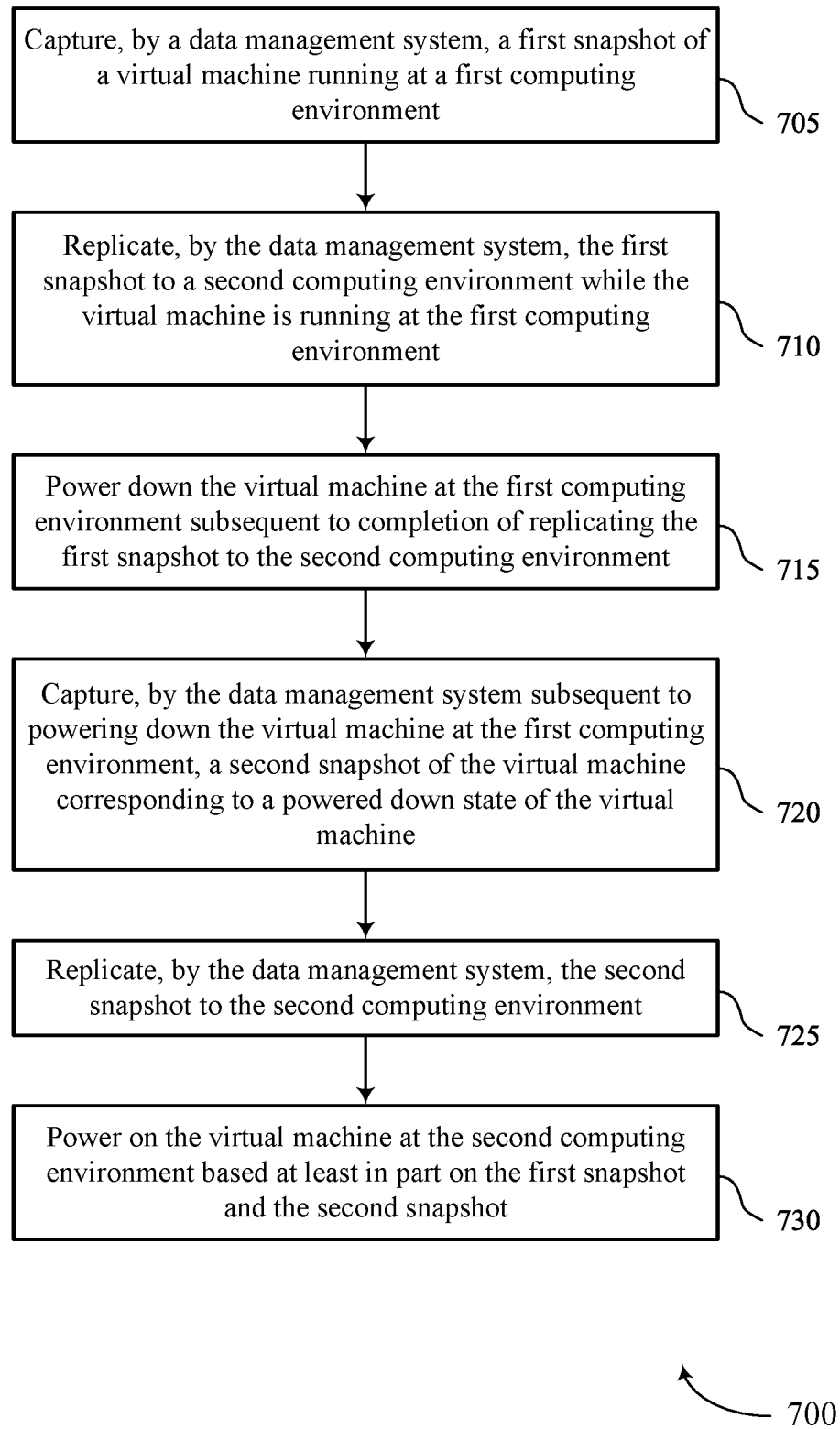
FIGS. 7 through 10 show flowcharts illustrating methods that support lossless failover for data recovery in accordance with aspects of the present disclosure.

FIG. 7 shows a flowchart illustrating a method 700 that supports lossless failover for data recovery in accordance with aspects of the present disclosure. The operations of the method 700 may be implemented by a data management component or its components as described herein. For example, the operations of the method 700 may be performed by a DMS as described with reference to FIGS. 1 through 6. In some examples, a DMS may execute a set of instructions to control the functional elements of the DMS to perform the described functions. Additionally, or alternatively, the DMS may perform aspects of the described functions using special-purpose hardware.

At 705, the method may include capturing, by a DMS, a first snapshot of a VM running at a first computing environment. The operations of 705 may be performed in accordance with examples as disclosed herein. In some examples, aspects of the operations of 705 may be performed by a snapshot capturing manager 525 as described with reference to FIG. 5.

At 710, the method may include replicating, by the DMS, the first snapshot to a second computing environment while the VM is running at the first computing environment. The operations of 710 may be performed in accordance with examples as disclosed herein. In some examples, aspects of the operations of 710 may be performed by a snapshot replication manager 530 as described with reference to FIG. 5.

At 715, the method may include powering down the VM at the first computing environment subsequent to completion of replicating the first snapshot to the second computing environment. The operations of 715 may be performed in accordance with examples as disclosed herein. In some examples, aspects of the operations of 715 may be performed by a VM connection manager 535 as described with reference to FIG. 5.

At 720, the method may include capturing, by the DMS subsequent to powering down the VM at the first computing environment, a second snapshot of the VM corresponding to a powered down state of the VM. The operations of 720 may be performed in accordance with examples as disclosed herein. In some examples, aspects of the operations of 720 may be performed by a snapshot capturing manager 525 as described with reference to FIG. 5.

At 725, the method may include replicating, by the DMS, the second snapshot to the second computing environment. The operations of 725 may be performed in accordance with examples as disclosed herein. In some examples, aspects of the operations of 725 may be performed by a snapshot replication manager 530 as described with reference to FIG. 5.

At 730, the method may include powering on the VM at the second computing environment based on the first snapshot and the second snapshot. The operations of 730 may be performed in accordance with examples as disclosed herein. In some examples, aspects of the operations of 730 may be performed by a VM initiation manager 540 as described with reference to FIG. 5.

Figure 8:
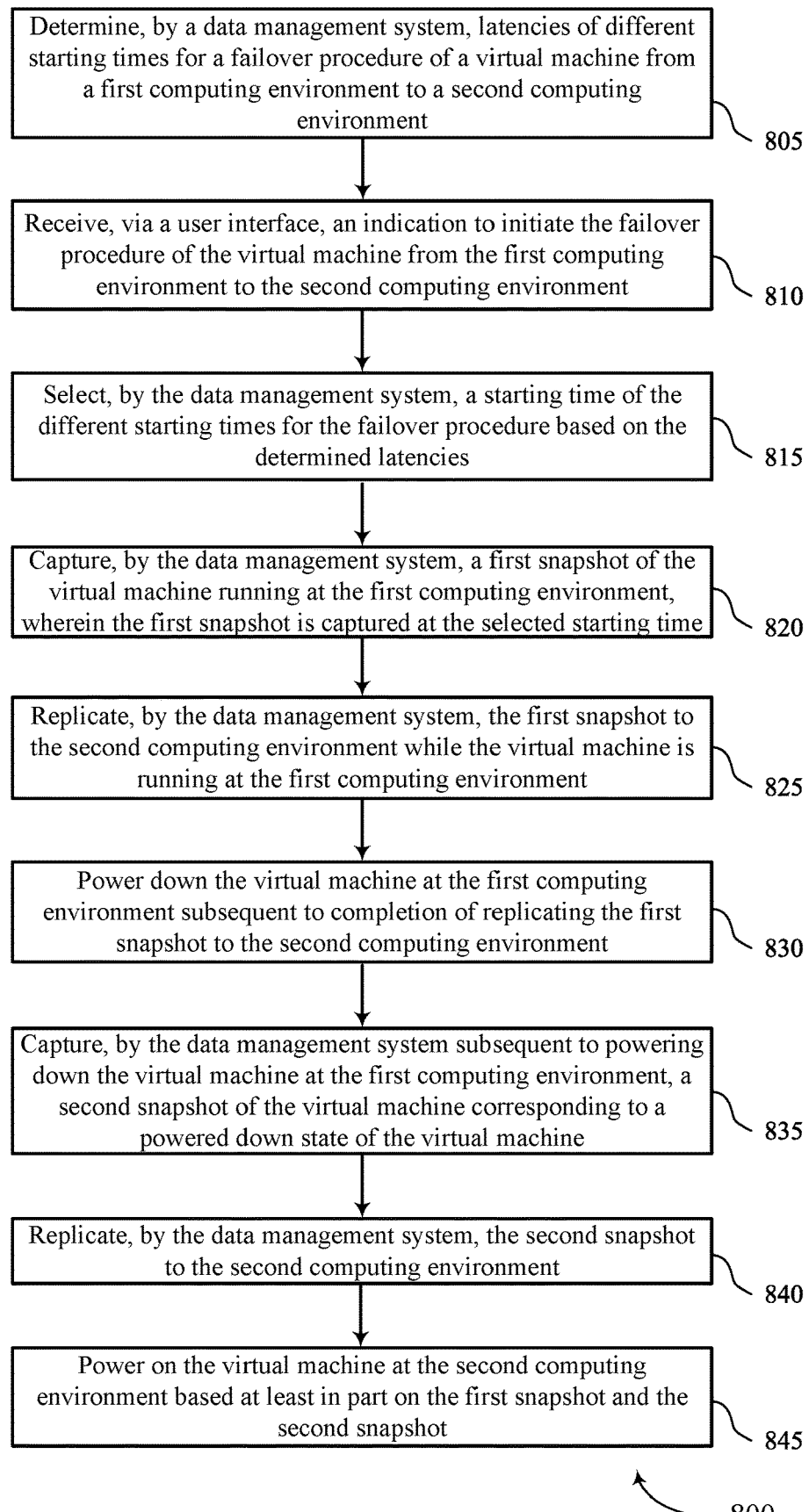

FIG. 8 shows a flowchart illustrating a method 800 that supports lossless failover for data recovery in accordance with aspects of the present disclosure. The operations of the method 800 may be implemented by a DMS or its components as described herein. For example, the operations of the method 800 may be performed by a DMS as described with reference to FIGS. 1 through 6. In some examples, a DMS may execute a set of instructions to control the functional elements of the DMS to perform the described functions. Additionally, or alternatively, the DMS may perform aspects of the described functions using special-purpose hardware.

At 805, the method may include determining, by a DMS, latencies of different starting times for a failover procedure of a VM from a first computing environment to a second computing environment. The operations of 805 may be performed in accordance with examples as disclosed herein. In some examples, aspects of the operations of 805 may be performed by a latency calculation manager 545 as described with reference to FIG. 5.

At 810, the method may include receiving, via a UI, an indication to initiate the failover procedure of the VM from the first computing environment to the second computing environment. The operations of 810 may be performed in accordance with examples as disclosed herein. In some examples, aspects of the operations of 810 may be performed by a failover initiation manager 560 as described with reference to FIG. 5.

At 815, the method may include selecting, by the DMS, a starting time of the different starting times for the failover procedure based on the determined latencies. The operations of 815 may be performed in accordance with examples as disclosed herein. In some examples, aspects of the operations of 815 may be performed by a selected starting time manager 555 as described with reference to FIG. 5.

At 820, the method may include capturing, by the DMS, the first snapshot of the VM running at the first computing environment, where the first snapshot is captured at the selected starting time. The operations of 820 may be performed in accordance with examples as disclosed herein. In some examples, aspects of the operations of 820 may be performed by a snapshot capturing manager 525 as described with reference to FIG. 5.

At 825, the method may include replicating, by the DMS, the first snapshot to the second computing environment while the VM is running at the first computing environment. The operations of 825 may be performed in accordance with examples as disclosed herein. In some examples, aspects of the operations of 825 may be performed by a snapshot replication manager 530 as described with reference to FIG. 5.

At 830, the method may include powering down the VM at the first computing environment subsequent to completion of replicating the first snapshot to the second computing environment. The operations of 830 may be performed in accordance with examples as disclosed herein. In some examples, aspects of the operations of 830 may be performed by a VM connection manager 535 as described with reference to FIG. 5.

At 835, the method may include capturing, by the DMS subsequent to powering down the VM at the first computing environment, a second snapshot of the VM corresponding to a powered down state of the VM. The operations of 835 may be performed in accordance with examples as disclosed herein. In some examples, aspects of the operations of 835 may be performed by a snapshot capturing manager 525 as described with reference to FIG. 5.

At 840, the method may include replicating, by the DMS, the second snapshot to the second computing environment. The operations of 840 may be performed in accordance with examples as disclosed herein. In some examples, aspects of the operations of 840 may be performed by a snapshot replication manager 530 as described with reference to FIG. 5.

At 845, the method may include powering on the VM at the second computing environment based on the first snapshot and the second snapshot. The operations of 845 may be performed in accordance with examples as disclosed herein. In some examples, aspects of the operations of 845 may be performed by a VM initiation manager 540 as described with reference to FIG. 5.

Figure 9:
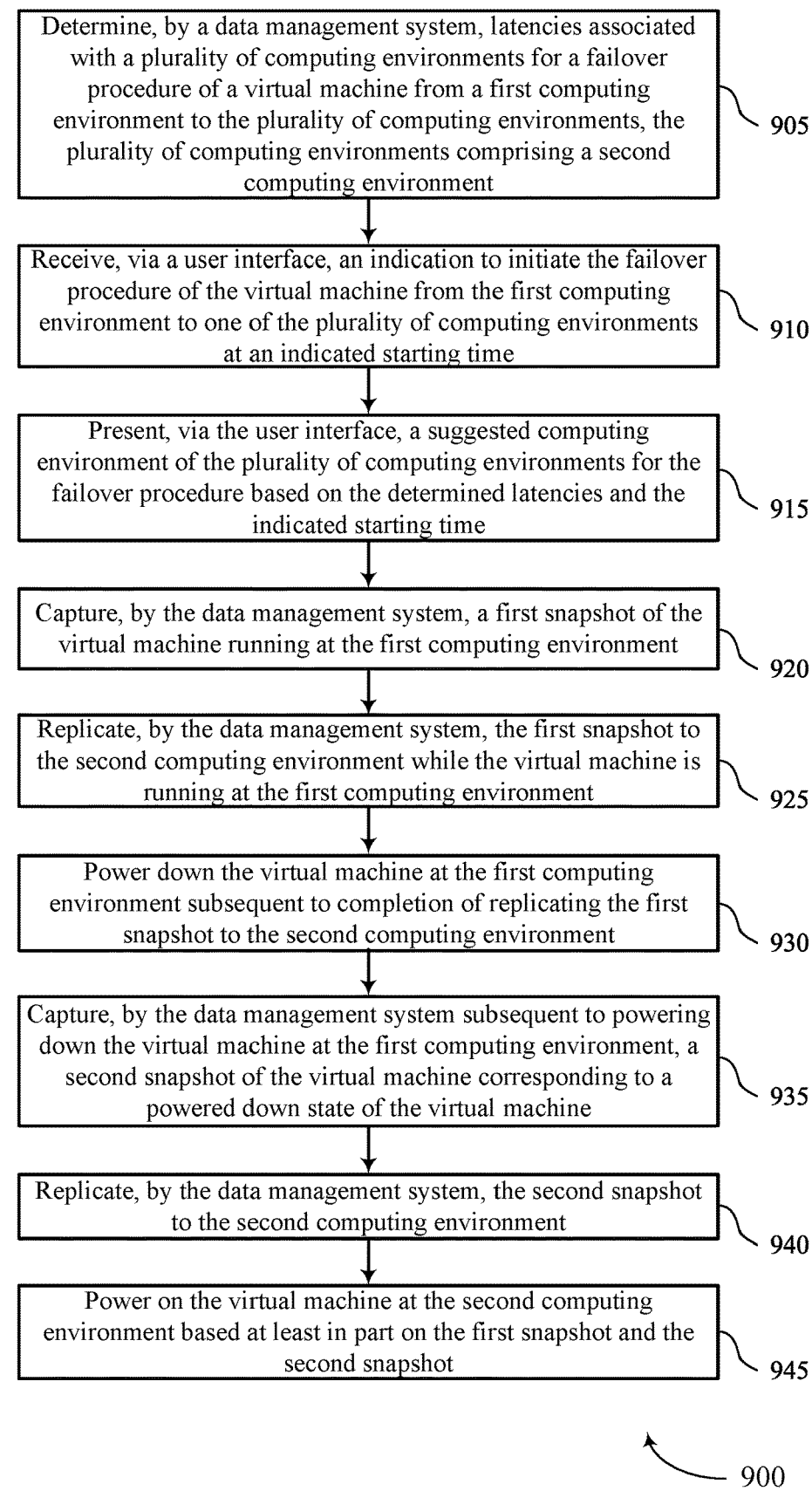

FIG. 9 shows a flowchart illustrating a method 900 that supports lossless failover for data recovery in accordance with aspects of the present disclosure. The operations of the method 900 may be implemented by a DMS or its components as described herein. For example, the operations of the method 900 may be performed by a DMS as described with reference to FIGS. 1 through 6. In some examples, a DMS may execute a set of instructions to control the functional elements of the DMS to perform the described functions. Additionally, or alternatively, the DMS may perform aspects of the described functions using special-purpose hardware.

At 905, the method may include determining, by a DMS, latencies associated with a set of multiple computing environments for a failover procedure of a VM from a first computing environment to the set of multiple computing environments, the set of multiple computing environments including a second computing environment. The operations of 905 may be performed in accordance with examples as disclosed herein. In some examples, aspects of the operations of 905 may be performed by a latency calculation manager 545 as described with reference to FIG. 5.

At 910, the method may include receiving, via a UI, an indication to initiate the failover procedure of the VM from the first computing environment to one of the set of multiple computing environments at an indicated starting time. The operations of 910 may be performed in accordance with examples as disclosed herein. In some examples, aspects of the operations of 910 may be performed by a selected starting time manager 555 as described with reference to FIG. 5.

At 915, the method may include presenting, via the UI, a suggested computing environment of the set of multiple computing environments for the failover procedure based on the determined latencies and the indicated starting time. The operations of 915 may be performed in accordance with examples as disclosed herein. In some examples, aspects of the operations of 915 may be performed by a suggested computing environment manager 575 as described with reference to FIG. 5.

At 920, the method may include capturing, by the DMS, a first snapshot of the VM running at the first computing environment. The operations of 920 may be performed in accordance with examples as disclosed herein. In some examples, aspects of the operations of 920 may be performed by a snapshot capturing manager 525 as described with reference to FIG. 5.

At 925, the method may include replicating, by the DMS, the first snapshot to the second computing environment while the VM is running at the first computing environment. In some examples, the suggested computing environment presented at 915 may be the second computing environment. In some examples, regardless of whether the suggested computing environment presented at 915 is the second computing environment, the DMS may receive an indication of the second computing environment (e.g., after presenting the suggested computing environment at 915). The operations of 925 may be performed in accordance with examples as disclosed herein. In some examples, aspects of the operations of 925 may be performed by a snapshot replication manager 530 as described with reference to FIG. 5.

At 930, the method may include powering down the VM at the first computing environment subsequent to completion of replicating the first snapshot to the second computing environment. The operations of 930 may be performed in accordance with examples as disclosed herein. In some examples, aspects of the operations of 930 may be performed by a VM connection manager 535 as described with reference to FIG. 5.

At 935, the method may include capturing, by the DMS subsequent to powering down the VM at the first computing environment, a second snapshot of the VM corresponding to a powered down state of the VM. The operations of 935 may be performed in accordance with examples as disclosed herein. In some examples, aspects of the operations of 935 may be performed by a snapshot capturing manager 525 as described with reference to FIG. 5.

At 940, the method may include replicating, by the DMS, the second snapshot to the second computing environment. The operations of 940 may be performed in accordance with examples as disclosed herein. In some examples, aspects of the operations of 940 may be performed by a snapshot replication manager 530 as described with reference to FIG. 5.

At 945, the method may include powering on the VM at the second computing environment based on the first snapshot and the second snapshot. The operations of 945 may be performed in accordance with examples as disclosed herein. In some examples, aspects of the operations of 945 may be performed by a VM initiation manager 540 as described with reference to FIG. 5.

Figure 10:
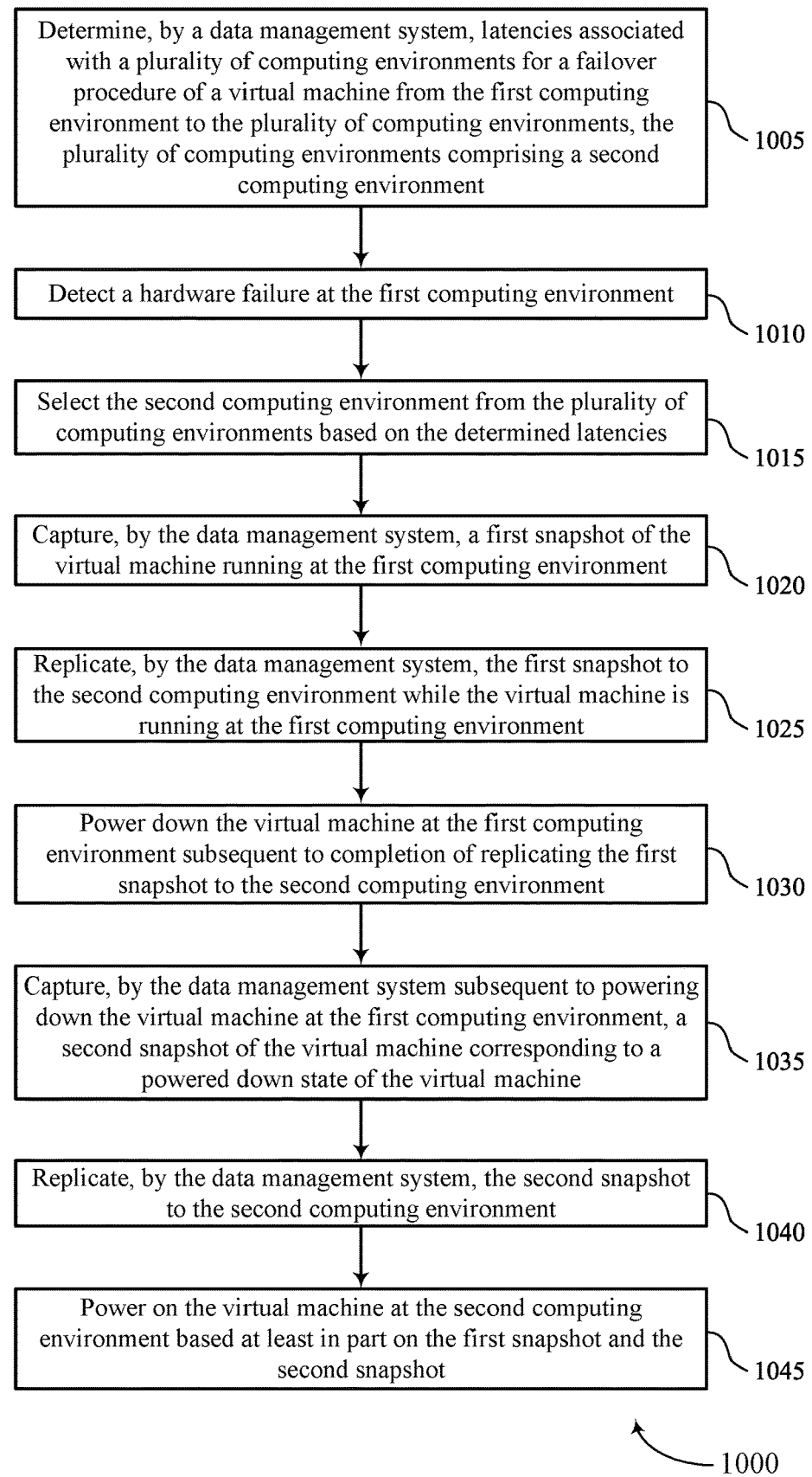

FIG. 10 shows a flowchart illustrating a method 1000 that supports lossless failover for data recovery in accordance with aspects of the present disclosure. The operations of the method 1000 may be implemented by a DMS or its components as described herein. For example, the operations of the method 1000 may be performed by a DMS as described with reference to FIGS. 1 through 6. In some examples, a DMS may execute a set of instructions to control the functional elements of the DMS to perform the described functions. Additionally, or alternatively, the DMS may perform aspects of the described functions using special-purpose hardware.

At 1005, the method may include determining, by a DMS, latencies associated with a set of multiple computing environments for a failover procedure of a VM from a first computing environment to the set of multiple computing environments, the set of multiple computing environments including a second computing environment. The operations of 1005 may be performed in accordance with examples as disclosed herein. In some examples, aspects of the operations of 1005 may be performed by a latency calculation manager 545 as described with reference to FIG. 5.

At 1010, the method may include detecting a hardware failure at the first computing environment. The operations of 1010 may be performed in accordance with examples as disclosed herein. In some examples, aspects of the operations of 1010 may be performed by a hardware failure detection manager 580 as described with reference to FIG. 5.

At 1015, the method may include selecting the second computing environment from the set of multiple computing environments based on the determined latencies. The operations of 1015 may be performed in accordance with examples as disclosed herein. In some examples, aspects of the operations of 1015 may be performed by a selected computing environment manager 570 as described with reference to FIG. 5.

At 1020, the method may include capturing, by the DMS, a first snapshot of the VM running at the first computing environment, where initiating capturing the first snapshot may be based on the detected hardware failure. The operations of 1020 may be performed in accordance with examples as disclosed herein. In some examples, aspects of the operations of 1020 may be performed by a snapshot capturing manager 525 as described with reference to FIG. 5.

At 1025, the method may include replicating, by the DMS, the first snapshot to the second computing environment while the VM is running at the first computing environment. The operations of 1025 may be performed in accordance with examples as disclosed herein. In some examples, aspects of the operations of 1025 may be performed by a snapshot replication manager 530 as described with reference to FIG. 5.

At 1030, the method may include powering down the VM at the first computing environment subsequent to completion of replicating the first snapshot to the second computing environment. The operations of 1030 may be performed in accordance with examples as disclosed herein. In some examples, aspects of the operations of 1030 may be performed by a VM connection manager 535 as described with reference to FIG. 5.

At 1035, the method may include capturing, by the DMS subsequent to powering down the VM at the first computing environment, a second snapshot of the VM corresponding to a powered down state of the VM. The operations of 1035 may be performed in accordance with examples as disclosed herein. In some examples, aspects of the operations of 1035 may be performed by a snapshot capturing manager 525 as described with reference to FIG. 5.

At 1040, the method may include replicating, by the DMS, the second snapshot to the second computing environment. The operations of 1040 may be performed in accordance with examples as disclosed herein. In some examples, aspects of the operations of 1040 may be performed by a snapshot replication manager 530 as described with reference to FIG. 5.

At 1045, the method may include powering on the VM at the second computing environment based on the first snapshot and the second snapshot. The operations of 1050 may be performed in accordance with examples as disclosed herein. In some examples, aspects of the operations of 1045 may be performed by a VM initiation manager 540 as described with reference to FIG. 5.

A method is described. The method may include capturing, by a DMS, a first snapshot of a VM running at a first computing environment, replicating, by the DMS, the first snapshot to a second computing environment while the VM is running at the first computing environment, powering down the VM at the first computing environment subsequent to completion of replicating the first snapshot to the second computing environment, capturing, by the DMS subsequent to powering down the VM at the first computing environment, a second snapshot of the VM corresponding to a powered down state of the VM, replicating, by the DMS, the second snapshot to the second computing environment, and powering on the VM at the second computing environment based on the first snapshot and the second snapshot.

An apparatus is described. The apparatus may include a processor, memory coupled with the processor, and instructions stored in the memory. The instructions may be executable by the processor to cause the apparatus to capture, by a DMS, a first snapshot of a VM running at a first computing environment, replicate, by the DMS, the first snapshot to a second computing environment while the VM is running at the first computing environment, power down the VM at the first computing environment subsequent to completion of replicating the first snapshot to the second computing environment, capture, by the DMS subsequent to powering down the VM at the first computing environment, a second snapshot of the VM corresponding to a powered down state of the VM, replicate, by the DMS, the second snapshot to the second computing environment, and power on the VM at the second computing environment based on the first snapshot and the second snapshot.

Another apparatus is described. The apparatus may include means for capturing, by a DMS, a first snapshot of a VM running at a first computing environment, means for replicating, by the DMS, the first snapshot to a second computing environment while the VM is running at the first computing environment, means for powering down the VM at the first computing environment subsequent to completion of replicating the first snapshot to the second computing environment, means for capturing, by the DMS subsequent to powering down the VM at the first computing environment, a second snapshot of the VM corresponding to a powered down state of the VM, means for replicating, by the DMS, the second snapshot to the second computing environment, and means for powering on the VM at the second computing environment based on the first snapshot and the second snapshot.

A non-transitory computer-readable medium storing code is described. The code may include instructions executable by a processor to capture, by a DMS, a first snapshot of a VM running at a first computing environment, replicate, by the DMS, the first snapshot to a second computing environment while the VM is running at the first computing environment, power down the VM at the first computing environment subsequent to completion of replicating the first snapshot to the second computing environment, capture, by the DMS subsequent to powering down the VM at the first computing environment, a second snapshot of the VM corresponding to a powered down state of the VM, replicate, by the DMS, the second snapshot to the second computing environment, and power on the VM at the second computing environment based on the first snapshot and the second snapshot.

Some examples of the method, apparatuses, and non-transitory computer-readable medium described herein may further include operations, features, means, or instructions for determining, by the DMS, latencies of different starting times for a failover procedure of the VM from the first computing environment to the second computing environment.

Some examples of the method, apparatuses, and non-transitory computer-readable medium described herein may further include operations, features, means, or instructions for presenting, via a UI, the latencies and the different starting times and receiving, via the UI, an indication of a selected starting time, where the first snapshot may be captured at the selected starting time.

Some examples of the method, apparatuses, and non-transitory computer-readable medium described herein may further include operations, features, means, or instructions for receiving, via a UI, an indication to initiate the failover procedure of the VM from the first computing environment to the second computing environment and selecting, by the DMS, a starting time of the different starting times for the failover procedure based on the determined latencies, where the first snapshot may be captured at the selected starting time.

Some examples of the method, apparatuses, and non-transitory computer-readable medium described herein may further include operations, features, means, or instructions for receiving, via a UI, an indication to initiate the failover procedure of the VM from the first computing environment to the second computing environment and presenting, via the UI, a suggested starting time for the failover procedure based on the determined latencies.

In some examples of the method, apparatuses, and non-transitory computer-readable medium described herein, operations, features, means, or instructions for determining the latencies may include operations, features, means, or instructions for determining the latencies based on a throughput rate of data between the first computing environment and the second computing environment, a schedule of backups of the VM, or any combination thereof.

Some examples of the method, apparatuses, and non-transitory computer-readable medium described herein may further include operations, features, means, or instructions for determining, by the DMS, latencies associated with a set of multiple computing environments for a failover procedure of the VM from the first computing environment to the set of multiple computing environments, the set of multiple computing environments including the second computing environment.

Some examples of the method, apparatuses, and non-transitory computer-readable medium described herein may further include operations, features, means, or instructions for presenting, via a UI, the latencies and the set of multiple computing environments and receiving, via the UI, a selection of the second computing environment, where replicating the first snapshot to the second computing environment may be based on the selection.

Some examples of the method, apparatuses, and non-transitory computer-readable medium described herein may further include operations, features, means, or instructions for receiving, via a UI, an indication to initiate the failover procedure of the VM from the first computing environment to one of the set of multiple computing environments at an indicated starting time and presenting, via the UI, a suggested computing environment of the set of multiple computing environments for the failover procedure based on the determined latencies and the indicated starting time.

In some examples of the method, apparatuses, and non-transitory computer-readable medium described herein, determining the latencies may include operations, features, means, or instructions for determining the latencies based on respective throughput rates of data between the first computing environment and the set of multiple computing environments, respective schedules of backups of the VM, or any combination thereof.

Some examples of the method, apparatuses, and non-transitory computer-readable medium described herein may further include operations, features, means, or instructions for detecting a hardware failure at the first computing environment, selecting the second computing environment from the set of multiple computing environments based on the determined latencies, and initiating capturing the first snapshot based on the detected hardware failure.

In some examples of the method, apparatuses, and non-transitory computer-readable medium described herein, operations, features, means, or instructions for replicating the first snapshot to the second computing environment may include operations, features, means, or instructions for copying the first snapshot from the first computing environment to the second computing environment.

It should be noted that the methods described herein describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method, comprising:
determining, by a data management system, latencies of different starting times for a failover procedure of a virtual machine from a first computing environment to a second computing environment or latencies associated with a plurality of computing environments for the failover procedure of the virtual machine from the first computing environment to the plurality of computing environments, the plurality of computing environments comprising the second computing environment;
capturing, by the data management system, a first snapshot of the virtual machine running at the first computing environment;
replicating, by the data management system and based at least in part on the determined latencies of the different starting times or the determined latencies associated with the plurality of computing environments, the first snapshot to the second computing environment while the virtual machine is running at the first computing environment;
powering down the virtual machine at the first computing environment subsequent to completion of replicating the first snapshot to the second computing environment;
capturing, by the data management system subsequent to powering down the virtual machine at the first computing environment, a second snapshot of the virtual machine corresponding to a powered down state of the virtual machine;
replicating, by the data management system, the second snapshot to the second computing environment; and
powering on the virtual machine at the second computing environment based at least in part on the first snapshot and the second snapshot.

2. The method of claim 1, further comprising:
presenting, via a user interface, the latencies of the different starting times and the different starting times; and
receiving, via the user interface, an indication of a selected starting time, wherein the first snapshot is captured at the selected starting time.

3. The method of claim 1, further comprising:
receiving, via a user interface, an indication to initiate the failover procedure of the virtual machine from the first computing environment to the second computing environment; and
selecting, by the data management system, a starting time of the different starting times for the failover procedure based on the determined latencies of the different starting times, wherein the first snapshot is captured at the selected starting time.

4. The method of claim 1, further comprising:
receiving, via a user interface, an indication to initiate the failover procedure of the virtual machine from the first computing environment to the second computing environment; and
presenting, via the user interface, a suggested starting time for the failover procedure based on the determined latencies of the different starting times.

5. The method of claim 1, wherein determining the latencies of the different starting times comprises:
determining the latencies of the different starting times based on a throughput rate of data between the first computing environment and the second computing environment, a schedule of backups of the virtual machine, or any combination thereof.

6. The method of claim 1, further comprising:
presenting, via a user interface, the latencies associated with the plurality of computing environments and the plurality of computing environments; and
receiving, via the user interface, a selection of the second computing environment, wherein replicating the first snapshot to the second computing environment is based at least in part on the selection.

7. The method of claim 1, further comprising:
receiving, via a user interface, an indication to initiate the failover procedure of the virtual machine from the first computing environment to one of the plurality of computing environments at an indicated starting time; and
presenting, via the user interface, a suggested computing environment of the plurality of computing environments for the failover procedure based on the determined latencies associated with the plurality of computing environments and the indicated starting time.

8. The method of claim 1, wherein determining the latencies associated with the plurality of computing environments comprises:
determining the latencies associated with the plurality of computing environments based on respective throughput rates of data between the first computing environment and the plurality of computing environments, respective schedules of backups of the virtual machine, or any combination thereof.

9. The method of claim 1, further comprising:
detecting a hardware failure at the first computing environment;
selecting the second computing environment from the plurality of computing environments based on the determined latencies associated with the plurality of computing environments; and
initiating capturing the first snapshot based on the detected hardware failure.

10. The method of claim 1, wherein replicating the first snapshot to the second computing environment comprises:
copying the first snapshot from the first computing environment to the second computing environment.

11. An apparatus, comprising:
at least one processor;
memory coupled with the at least one processor; and
instructions stored in the memory and executable by the at least one processor to cause the apparatus to:
determine, by a data management system, latencies of different starting times for a failover procedure of a virtual machine from a first computing environment to a second computing environment or latencies associated with a plurality of computing environments for the failover procedure of the virtual machine from the first computing environment to the plurality of computing environments, the plurality of computing environments comprising the second computing environment;
capture, by the data management system, a first snapshot of the virtual machine running at the first computing environment;
replicate, by the data management system and based at least in part on the determined latencies of the different starting times or the determined latencies associated with the plurality of computing environments, the first snapshot to the second computing environment while the virtual machine is running at the first computing environment;

power down the virtual machine at the first computing environment subsequent to completion of replicating the first snapshot to the second computing environment;

capture, by the data management system subsequent to powering down the virtual machine at the first computing environment, a second snapshot of the virtual machine corresponding to a powered down state of the virtual machine;

replicate, by the data management system, the second snapshot to the second computing environment; and power on the virtual machine at the second computing environment based at least in part on the first snapshot and the second snapshot.

12. The apparatus of claim 11, wherein the instructions are further executable by the at least one processor to cause the apparatus to:

present, via a user interface, the latencies of the different starting times and the different starting times; and receive, via the user interface, an indication of a selected starting time, wherein the first snapshot is captured at the selected starting time.

13. The apparatus of claim 11, wherein the instructions are further executable by the at least one processor to cause the apparatus to:

receive, via a user interface, an indication to initiate the failover procedure of the virtual machine from the first computing environment to the second computing environment; and select, by the data management system, a starting time of the different starting times for the failover procedure based on the determined latencies of the different starting times, wherein the first snapshot is captured at the selected starting time.

14. The apparatus of claim 11, wherein the instructions are further executable by the at least one processor to cause the apparatus to:

receive, via a user interface, an indication to initiate the failover procedure of the virtual machine from the first computing environment to the second computing environment; and present, via the user interface, a suggested starting time for the failover procedure based on the determined latencies of the different starting times.

15. The apparatus of claim 11, wherein, to determine the latencies of the different starting times, the instructions are executable by the at least one processor to cause the apparatus to:

determine the latencies of the different starting times based on a throughput rate of data between the first computing environment and the second computing environment, a schedule of backups of the virtual machine, or any combination thereof.

16. The apparatus of claim 11, wherein the instructions are further executable by the at least one processor to cause the apparatus to:

presenting, via a user interface, the latencies associated with the plurality of computing environments and the plurality of computing environments; and receiving, via the user interface, a selection of the second computing environment, wherein replicating the first snapshot to the second computing environment is based at least in part on the selection.

17. The apparatus of claim 11, wherein the instructions are further executable by the at least one processor to cause the apparatus to:

receive, via a user interface, an indication to initiate the failover procedure of the virtual machine from the first computing environment to one of the plurality of computing environments at an indicated starting time; and present, via the user interface, a suggested computing environment of the plurality of computing environments for the failover procedure based on the determined latencies associated with the plurality of computing environments and the indicated starting time.

18. The apparatus of claim 11, wherein the instructions to determine the latencies associated with the plurality of computing environments are further executable by the at least one processor to cause the apparatus to:

determine the latencies associated with the plurality of computing environments based on respective throughput rates of data between the first computing environment and the plurality of computing environments, respective schedules of backups of the virtual machine, or any combination thereof.

19. The apparatus of claim 11, wherein the instructions are further executable by the at least one processor to cause the apparatus to:

detecting a hardware failure at the first computing environment;

selecting the second computing environment from the plurality of computing environments based on the determined latencies associated with the plurality of computing environments; and initiating capturing the first snapshot based on the detected hardware failure.

20. A non-transitory computer-readable medium storing code, the code comprising instructions executable by a processor to:

determine, by a data management system, latencies of different starting times for a failover procedure of a virtual machine from a first computing environment to a second computing environment or latencies associated with a plurality of computing environments for the failover procedure of the virtual machine from the first computing environment to the plurality of computing environments, the plurality of computing environments comprising the second computing environment;

capture, by the data management system, a first snapshot of the virtual machine running at the first computing environment;

replicate, by the data management system and based at least in part on the determined latencies of the different starting times or the determined latencies associated with the plurality of computing environments, the first snapshot to the second computing environment while the virtual machine is running at the first computing environment;

power down the virtual machine at the first computing environment subsequent to completion of replicating the first snapshot to the second computing environment;

capture, by the data management system subsequent to powering down the virtual machine at the first computing environment, a second snapshot of the virtual machine corresponding to a powered down state of the virtual machine;

replicate, by the data management system, the second snapshot to the second computing environment; and power on the virtual machine at the second computing environment based at least in part on the first snapshot and the second snapshot.

\* \* \* \* \*